(12) United States Patent
Lakshman et al.

(10) Patent No.: US 9,959,519 B2
(45) Date of Patent: May 1, 2018

(54) METHOD AND SYSTEM FOR TRANSIT CHARACTERISTIC PREDICTION

(75) Inventors: Girish S. Lakshman, Issaquah, WA (US); Llewellyn W. Bezanson, North Bend, WA (US); Pradeep Desai, Bellevue, WA (US)

(73) Assignee: Amazon Technologies, Inc., Reno, NV (US)

(*) Notice: Subject to any disclaimer, the term of this patent is extended or adjusted under 35 U.S.C. 154(b) by 2957 days.

(21) Appl. No.: 11/094,505

(22) Filed: Mar. 30, 2005

(65) Prior Publication Data

US 2006/0224398 A1    Oct. 5, 2006

(51) Int. Cl.
     *G06Q 10/08*     (2012.01)

(52) U.S. Cl.
     CPC ......... *G06Q 10/08* (2013.01); *G06Q 10/0833* (2013.01); *G06Q 10/08345* (2013.01)

(58) Field of Classification Search
     CPC . G06Q 10/08; G06Q 10/083; G06Q 10/08345
     USPC ...................................... 705/1, 1.1, 330–341
     See application file for complete search history.

(56) References Cited

U.S. PATENT DOCUMENTS

| | | | | |
|---|---|---|---|---|
| 5,265,006 | A * | 11/1993 | Asthana et al. | 705/8 |
| 5,963,919 | A * | 10/1999 | Brinkley et al. | 705/28 |
| 6,240,362 | B1 * | 5/2001 | Gaspard, II | 701/209 |
| 6,282,489 | B1 * | 8/2001 | Bellesfield et al. | 701/201 |
| 2001/0051876 | A1 | 12/2001 | Seigel et al. | |
| 2002/0013734 | A1 | 1/2002 | Bueno | |
| 2002/0082893 | A1 * | 6/2002 | Barts et al. | 705/8 |
| 2002/0147631 | A1 * | 10/2002 | Smith et al. | 705/10 |
| 2002/0165804 | A1 * | 11/2002 | Beebe et al. | 705/28 |
| 2003/0036938 | A1 * | 2/2003 | Dutta et al. | 705/8 |
| 2003/0195934 | A1 * | 10/2003 | Peterson et al. | 709/206 |

(Continued)

OTHER PUBLICATIONS

Orwant, Hietaniemi, and Macdonald, "Mastering Algorithms with Perl", Aug. 18, 1999.*

(Continued)

*Primary Examiner* — Carrie S Gilkey
(74) *Attorney, Agent, or Firm* — Robert C. Kowert; Meyertons, Hood, Kivlin, Kowert & Goetzel, P.C.

(57) ABSTRACT

A method and system for transit characteristic prediction. In one embodiment, a method may include determining respective transit latencies from a source location to a number of destination locations, and grouping the destination locations according to a similarity criterion into a number of subsets corresponding to respective geographical regions, where transit characteristics of locations grouped into a geographical region may each satisfy the similarity criterion. The method may further include determining a respective distribution associated with each of the geographical regions, where a given respective distribution correlates a given transit characteristic from the source location to a given geographical region with a respective surety factor, where the respective surety factor includes a cumulative probability that the given transit characteristic will be achieved. The method may also include dynamically updating the respective transit characteristic, the grouping of destination locations into geographical regions and the respective distributions dependent upon collecting empirical transit data.

52 Claims, 11 Drawing Sheets

(56) References Cited

U.S. PATENT DOCUMENTS

2004/0243472 A1    12/2004   Vadjinia
2004/0249742 A1*   12/2004   Laurent et al. ................. 705/37

OTHER PUBLICATIONS

Microsoft Windows 2000 Server TCP/IP Core Networking Guide, Jan. 19, 2000.*
Ho and Zheng, "Setting Customer Expectation in Service Delivery: An Integrated Marketing-Operations Perspective" Jun. 1, 2003.*
International Search Report in Application No. PCTUS06/07981 dated Dec. 28, 2006.
International Search Report from Application No. 06737189.8-1238 / 1869404 (PCT/US2006007981), dated May 28, 2010.

* cited by examiner

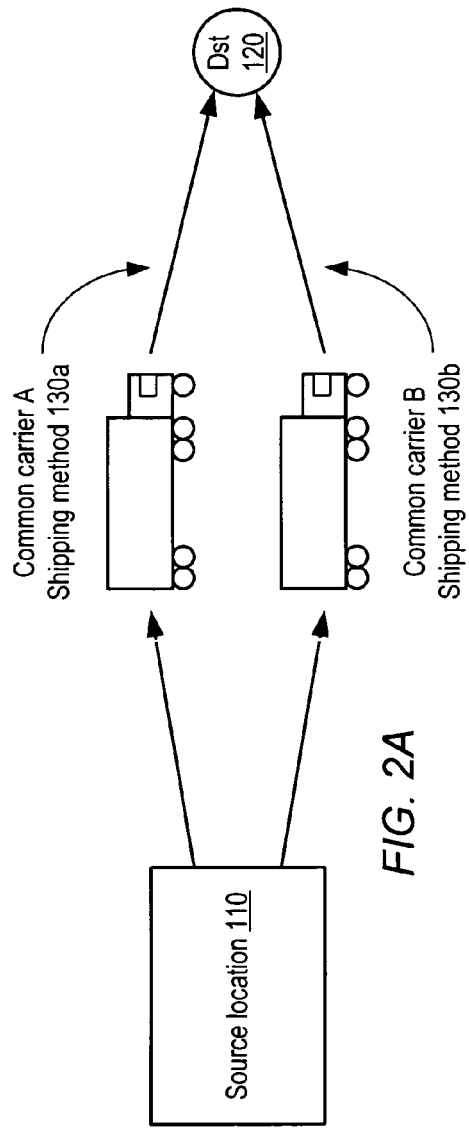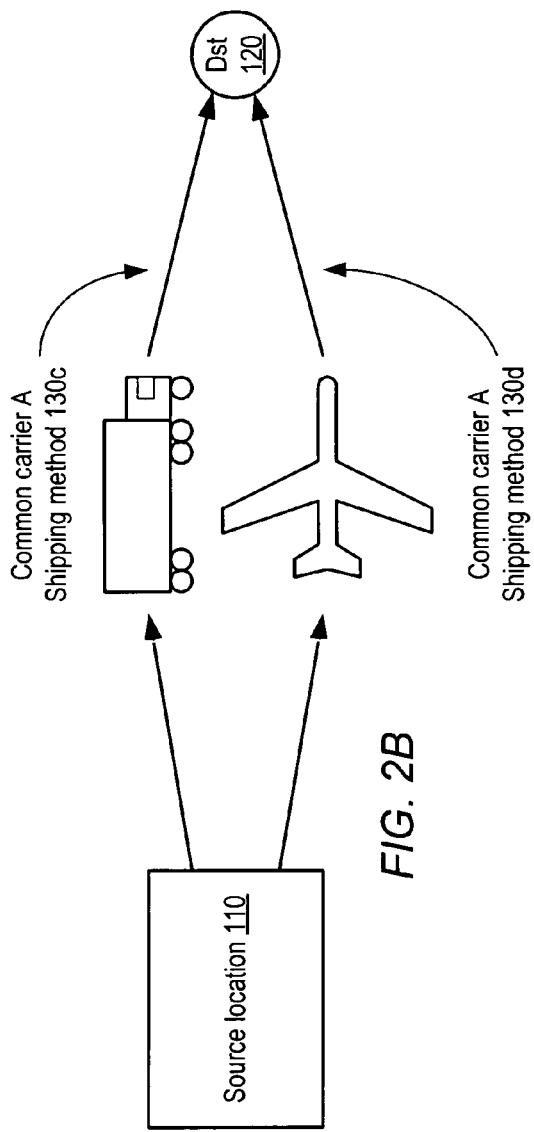
FIG. 2A
FIG. 2B

METHOD AND SYSTEM FOR TRANSIT CHARACTERISTIC PREDICTION

BACKGROUND OF THE INVENTION

Field of the Invention

This invention relates to transit logistics and, more particularly, to predicting characteristics of transit between source locations and destination locations.

Description of the Related Art

In the course of commerce, manufacturing and other business activities, different kinds of material often need to be conveyed from one location to another. For example, a global, web-based or brick-and-mortar retail sales operation may routinely ship packages containing customer orders around the world. Similarly, a distributed manufacturing operation may ship components or partially-assembled items from one manufacturing site to another for continued processing. Materials conveyance may also occur on a smaller scale, such as from a materials receiving area of a large, complex manufacturing site to one of a number of processing areas within the site.

Reliably predicting a transit characteristic, such as the time required to convey materials from one location to another (also referred to as transit time or transit latency), may be a critical parameter in an enterprise's operations. For example, in a manufacturing operation, overestimating transit time may result in having to hold materials in inventory until they are expected to be used, which may incur various logistical, facilities and overhead costs. By contrast, underestimating transit time may result in manufacturing downtime if reserves of materials are not available, which may result in lost productivity, missed production deadlines, etc. Similarly, a retail operation may find itself unable to meet customer demand or may suffer other problems with its supply chain to the extent that its supply-chain transit latencies remain unpredictable.

However, as the number of possible sources and destinations for materials increases, the number of possible transit paths to be predicted and managed quickly becomes intractable. For example, given M source locations that can ship materials to N possible different destinations, the number of possible transit paths is on the order of MN, and may be even higher if multiple different carriers or transit modalities are considered. For a retailer that ships directly to customers' businesses or residences, the number of possible destinations may number in the tens or hundreds of millions, resulting in correspondingly many potential data points to be stored. Searching through such a large number of data points to predict transit time for a particular source and destination consequently may be prohibitively expensive. Further, for a given source and destination, no historical data points may exist from which to predict transit time, or the data may be insufficient in quality or quantity for a meaningful prediction.

SUMMARY

Various embodiments of a method and system for transit characteristic prediction are disclosed. According to one embodiment, a method may include determining respective transit latencies from a source location to a number of destination locations, and grouping the destination locations according to a similarity criterion into a number of subsets corresponding to respective geographical regions. Transit characteristics of destination locations grouped into a given geographical region may each satisfy the similarity criterion.

The method may further include determining a respective distribution associated with each of the geographical regions. A given respective distribution may correlate a given transit characteristic from the source location to a given geographical region with a respective surety factor, where the respective surety factor includes a cumulative probability that the given transit characteristic will be achieved. The method may also include dynamically updating the respective transit characteristics, the grouping of destination locations into geographical regions and the respective distributions dependent upon collecting empirical transit data. In various specific implementations, transit characteristics may include transit latencies, distributions, transit rates, or other characteristics.

A system is further contemplated that in one embodiment may include an application program, a web services interface, and a transit characteristic model, where the application program may be configured to request from the transit characteristic model via the web services interface a prediction of a transit characteristic from a source location to a given destination location. The transit characteristic model may be configured to determine respective transit characteristic from the source location to a number of destination locations and to group the destination locations according to a similarity criterion into a number of subsets corresponding to respective geographical regions. Transit characteristics of destination locations grouped into a given geographical region may each satisfy the similarity criterion. The transit characteristic model may be further configured to determine a respective latency distribution associated with each of the geographical regions, where a given respective latency distribution correlates a given transit characteristic from the source location to a given geographical region with a respective surety factor. The respective surety factor may include a cumulative probability that the given transit characteristic will be achieved. The transit characteristic model may also be configured to predict the transit characteristic to the given destination location, where the prediction includes determining that the particular destination location falls within a particular one of the geographical regions, evaluating the distribution associated with the particular geographical region to determine the predicted transit characteristic, and returning the predicted transit characteristic to the application.

BRIEF DESCRIPTION OF THE DRAWINGS

FIGS. 2A-B are block diagrams illustrating exemplary embodiments of shipping methods between source locations and destination locations.

Figure 1:
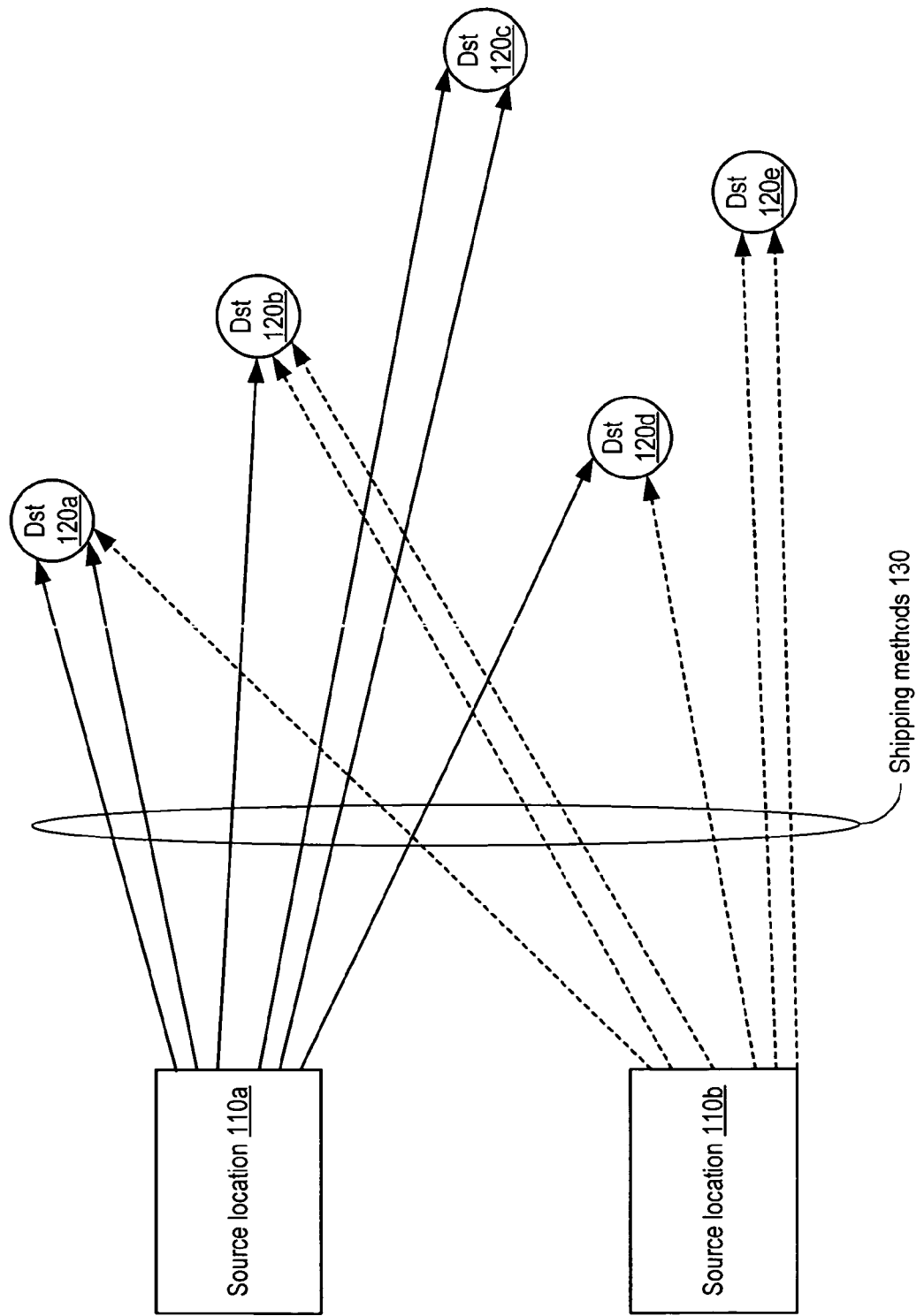
FIG. 1 is a block diagram illustrating one embodiment of source locations, destination locations and shipping methods between sources and destinations.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Introduction

As mentioned above, modeling transit time or other transit characteristics between individual source and destination locations may quickly become intractable as the number of sources and destinations increases, e.g., to a global geographical scale. In the discussion below, a method for grouping destination locations into geographical regions according to similarity of transit times to those destinations from a source location is described. Rather than predicting and managing transit paths to individual destinations, such paths may be predicted on a region-by-region basis, which may dramatically reduce the complexity of the data required while preserving accuracy and flexibility in prediction. For example, in one, embodiment the transit time from a source to a given region may be modeled as a probability distribution rather than a single, static value, which may enable a more sophisticated analysis of possible transit scenarios to the given region.

In the following discussion, a general overview of transit methods between sources and destinations is first provided. Subsequently, the dynamic modeling of destinations as regions is described, as well as the modeling of transit time distributions within particular regions. An exemplary embodiment of a system that may be configured to perform transit time modeling is also shown, and several applications of such modeling are described. However, it is noted that this organization is intended to facilitate exposition, and the embodiments described herein are not limited by section headings or the order in which the sections are presented.

Sources, Destinations and Transit Methods

In the embodiment of FIG. 1, a number of source locations 110a-b as well as a number of destination locations 120a-e are shown. Additionally, a number of shipping methods 130 between some of source locations 110 and destination locations 120 are shown. It is noted that in various embodiments, an arbitrary number of source locations 110, destination locations 120 and shipping methods 130 between them may be provided. For simplicity of reference, source locations 110 and destination locations 120 may also be referred to simply as sources 110 and destinations 120.

Generally speaking, a source location 110 may include any type of point of origin or departure for materials in transit, and similarly a destination location 120 may include any type of intermediate or final destination point. For example, in one embodiment a source location 110 may include a warehouse or fulfillment center within which inventory may be stored and items may be selected and packaged for delivery to customers. A source location 110 may also include a third party shipper or drop shipper, e.g., a manufacturer, wholesaler or other party in possession of items, who may ship items upon receiving instructions to do so from a retailer or other party who is primarily responsible for managing the order. A destination location 120 may include, for example, a business or residential location identified by an address (e.g., a street address including a postal code). In other embodiments, source locations 110 and destination locations 120 may correspond to other types of facilities or locations, such as manufacturing plants, raw materials sources, product distributors or wholesalers, virtual or physical retailers, etc.

It is noted that neither source location 110 nor destination location 120 need represent the ultimate source or destination of an item in transit. For example, as described below in conjunction with the description of FIG. 2, in some embodiments multiple different modes or methods of transit may be used to convey materials from an originating source to a final destination. Thus, a destination location 120 with respect to one leg of transit, such as a common carrier's shipping hub, may serve as a source location 110 with respect to another leg of transit. Additionally, in some embodiments an entire supply chain for an item, from raw materials, manufacturing and distribution to final delivery to a customer may be modeled as a series of materials conveyance between source locations 110 and destination locations 120. For example, in the course of manufacturing an item or assembling an order including multiple different items, multiple different paths from different source locations 110 may correspond to the movement of raw materials or inventory throughout the supply chain. These paths may be modeled and tracked through the stage of assembly, packaging, delivery, etc., for example to coordinate just-in-time materials management, to meet manufacturing or shipping deadlines, or to meet other operational goals.

It is also noted that in some embodiments, the role of a source location 110 and a destination location 120 may be reversed with respect to a given item in transit. For example, in some instances defective items or excess quantities may be returned from a given destination location 120 to the source location 110 from which they were received, or possibly to another source location 110.

As a practical matter, it may be inconvenient or undesirable to provide for conveyance of items from every source location 110 to every destination location 120. For example, a fulfillment center on the West Coast of the United States may be better suited in general to service shipments destined for western states and Asia, whereas a fulfillment center on the East Coast may be preferable for servicing shipments to the eastern United States and Europe. Correspondingly, in the embodiment of FIG. 1, multiple different shipping methods 130 are illustrated between some pairs of source locations 110 and destination locations 120, while no paths are illustrated between other pairs of source and destination locations. However, in principle it may generally be possible to convey an item from any given source location 110 to any given destination location 120 within some number of transit operations (e.g., via shipment to intermediate destinations 120, shipping hubs, etc.). Also, it is contemplated that in some embodiments, transshipment between two source locations 110 or two destination locations 120 may be performed. For example, inventory may be repositioned from one fulfillment center to another. For purposes of modeling and analysis, as noted above, a source location 110 may be modeled as a destination location 120 (or vice versa) under such circumstances.

FIGS. 2A-B illustrate several exemplary embodiments of particular shipping methods 130. As illustrated in FIG. 2A, in one embodiment two different shipping methods 130a-b between a source location 110 and a destination location 120 may correspond to the same mode or class of transit provided by two different common carriers, A and B. For example, shipping methods 130a-b may correspond to a surface-based mode of transit (e.g., ground service) provided by United Parcel Service (UPS) and FedEx, respectively. By contrast, as illustrated in FIG. 2B, in one embodiment shipping methods 130c-d may correspond to different modes of transit provided by the same common carrier A. For example, in this embodiment shipping methods 130c-d may correspond respectively to UPS Ground service and UPS Two-Day Air service.

Numerous possible combinations of carriers and classes or modes of transit may exist between a source 110 and a destination 120. For example, common carriers may include DHL, the United States Postal Service, and other shipping companies as well as the postal services of other countries. Additionally, privately contracted carriers (e.g., company-owned or leased fleets) may be employed to implement shipping methods 130 as an alternative or complement to the use of common carriers. In some embodiments, for example where sources 110 and destinations 120 are located within a single facility, shipping methods 130 may include various smaller-scale procedures and resources for moving materials, such as manned push carts, trucks, conveyor systems, etc. Generally speaking, a shipping method 130 may encompass any suitable method for conveying tangible goods from one location to another on a large or small geographic scale, including common or private carriers, land, air or sea modes, etc. In one embodiment, each shipping method 130 may be independently modeled to yield predictions regarding transit times from sources 110 to destinations 120 using a particular shipping method 130.

Geographical Regions and Transit Time Modeling

Ideally, a predictive model of a shipping method 130 will present an accurate representation of the actual behavior of shipping method 130. Correspondingly, in one embodiment a predictive model of a shipping method 130 may be constructed through analysis of empirical transit data of actual shipments from sources 110 to destinations 120. For example, many common carriers collect and maintain copious amounts of tracking data documenting the progress of packages in transit within their systems. Further, common carriers typically make such tracking data available to shippers and customers via a variety of interfaces, such as web services interfaces accessible via a shipper's computer system. Tracking data may, for example, indicate the date and time at which a package was accepted by the carrier for shipment from a source 110 (or in some cases, a suitable proxy for a source such as, e.g., the nearest shipping hub) as well as the date and time of delivery at a destination 120. In other embodiments, such as intra-facility materials handling, empirical transit data may be collected by materials handling systems, such as bar code or RFID (radio frequency identifier) scanning devices operating in conjunction with a locator system (e.g., a global position system (GPS)), for example.

Over time, empirical tracking data may yield a substantial number of data points regarding shipments from a given source 110 to a variety of destinations 120 using a particular shipping method 130. Tracking data or other shipping or conveyance data may be representative of any of a number of different transit characteristics of conveyance of materials from a source 110 to a destination 120. Generally speaking, a transit characteristic may encompass any measurable or empirically observable aspect of materials transit between a given source 110 and a given destination 120. For example, in one embodiment, a transit characteristic may include a transit latency between given source 110 and given destination 120. In another embodiment, a transit characteristic may include a probability distribution of some metric associated with transit between given source 110 and given destination 120, such as a probability distribution of transit latency values. For example, as described in greater detail below, a number of different data points representing historical shipments to a given destination 120 may be grouped into a probability distribution of those data points with respect to given destination 120, and the probability distribution may be considered a transit characteristic corresponding to transit between given source 110 and given destination 120. In still another embodiment, a transit characteristic may include a shipping rate or cost between given source 110 and given destination 120, or a distribution of such rates (e.g., according to package size, weight, quality of service, etc.). Other types of transit characteristics are also possible and contemplated.

In one embodiment, destinations 120 having respective transit characteristics from source 110 for shipping method 130 may be grouped into geographical regions according to a similarity criterion, such that a given region circumscribes destinations 120 whose transit characteristics satisfy the similarity criterion. For example, in one embodiment, the transit characteristic may encompass transit latency from source 110 via shipping method 130, and the similarity criterion may specify that destinations 120 be grouped if their transit latencies match exactly or within a given threshold of difference (e.g., an absolute number of units of latency, such as 0.5 units, or a percentage, such as 20%). Other applications of similarity criteria to grouping of destinations 120 into regions are described in greater detail below, and it is contemplated that in some embodiments, more than one similarity criterion may be employed in the grouping process. For simplicity of explanation, much of the following discussion refers to grouping of destinations 120 into regions on the basis of transit latencies. However, it is understood that the methods and techniques described below may generally apply to grouping of destinations 120 into regions on the basis of any suitable transit characteristic, including probability distributions (of transit latencies or other data), transit rates or other relevant characteristics.

Figure 3:
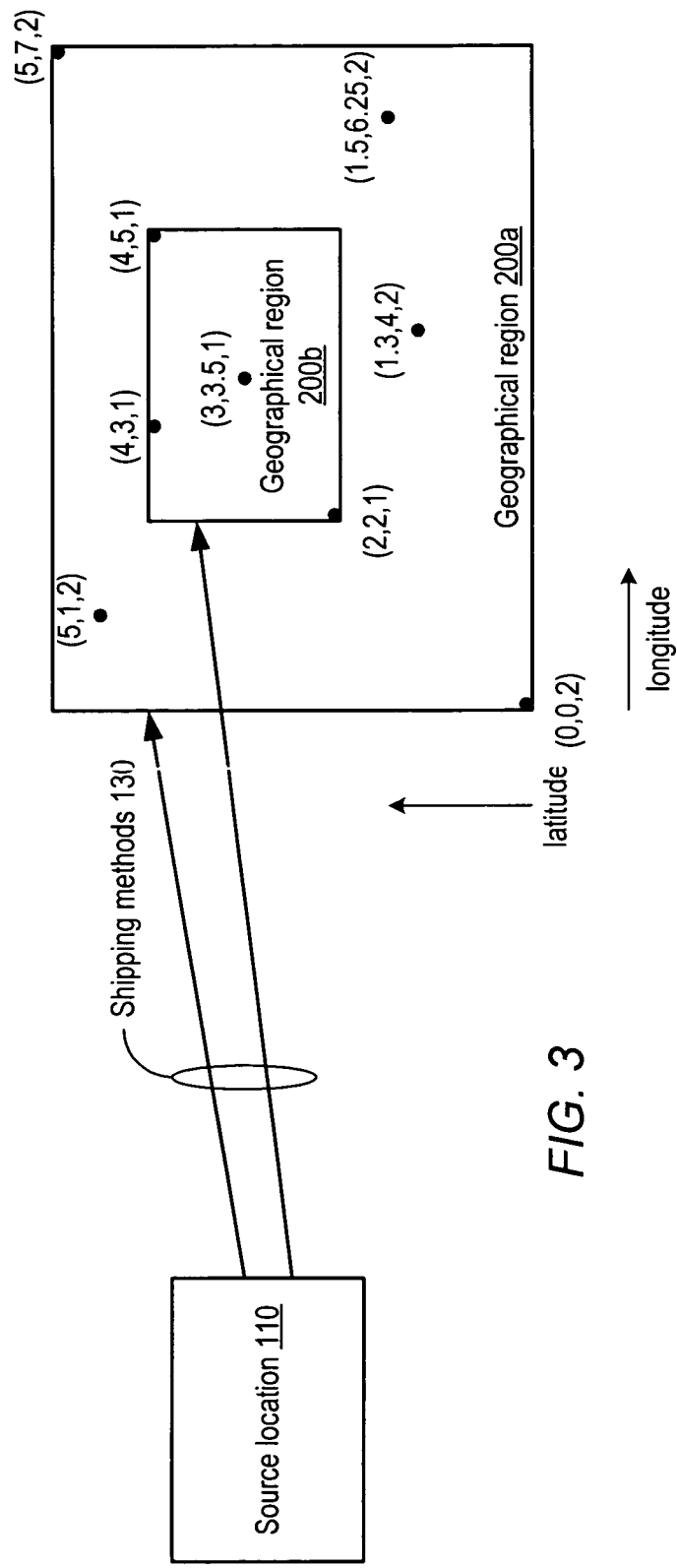
FIG. 3 is a block diagram illustrating an example grouping of destination locations into regions.
Figure 4:
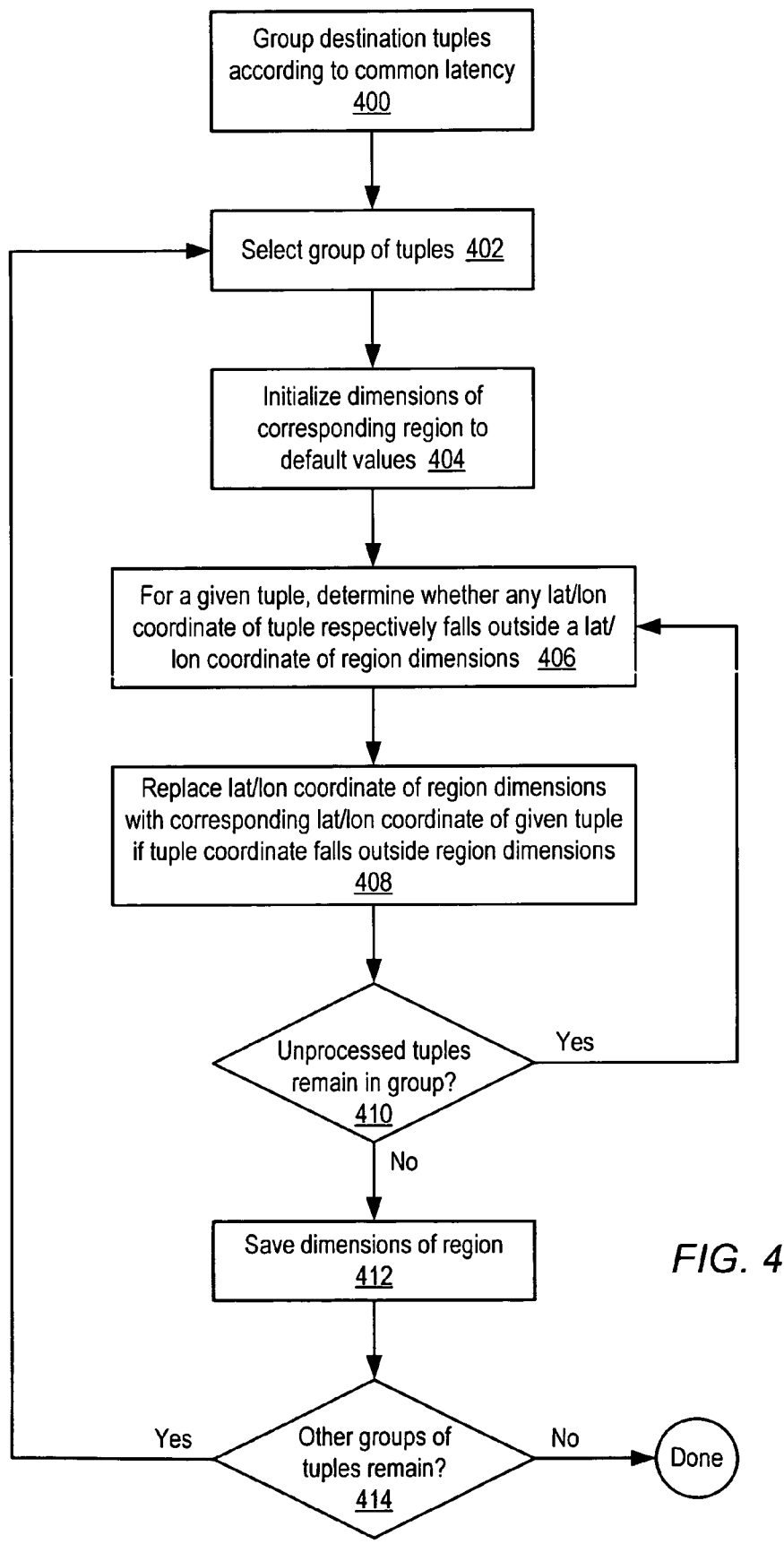
FIG. 4 is a flow diagram illustrating one embodiment of a method of grouping destinations into geographical regions according to transit time similarity.

One example illustrating the grouping of destinations 120 into regions is shown in FIG. 3 and the accompanying flow diagram of FIG. 4. In the illustrated embodiment, individual destinations 120 are identified using a coordinate system, such as a latitude-longitude coordinate system, a two-dimensional Cartesian coordinate system, or another suitable coordinate system. For purposes of explanation, a quasi-Cartesian latitude-longitude coordinate system will be assumed, although embodiments are not limited to such a system.

In FIG. 3, a number of destinations 120 are illustrated as solid circles, and empirical transit time data for each destination 120 is illustrated as a tuples of the form (latitude, longitude, latency) near each circle, where latency is the transit time (e.g., in days) from a particular source 110 to the destination 120 designated by latitude and longitude. A number of methods may be applied to the tuples to derive corresponding geographical regions. In the embodiment of the method illustrated in FIG. 4, the tuples may first be grouped or sorted according to common latency (block 400). For example, tuples having latency of 1 may be sorted into one group, tuples having a latency of 2 may be sorted into a second group, etc.

A first group of tuples is then selected, for example the group corresponding to a latency of 1 (block 402). The dimensions or boundary coordinates of the corresponding region are then initialized to a default value, such as a value of one of the tuples (block 404). For example, in one embodiment the dimensions or boundaries of a given rectangular region may be specified as a tuple of the form <(lat1, lon1), (lat2, lon2)>, where (lat1, lon1) represents the coordinates of the lower-left corner of the region, while (lat2, lon2) represents the coordinates of the upper-right corner of the region. In such an embodiment, the dimensions of the region corresponding to a latency of 1 may be initialized to, for example, <(4,3),(4,3)>. In some embodiments, coordinates may be negative. For example, latitude in the southern hemisphere or longitude in the western hemisphere may be represented as negative. The reverse sense may also be adopted, which may require reversing the sense of the conditions that follow.

Once initial region dimensions have been determined, in one embodiment, for a given tuple (lat, lon, latency) within the group, the tuple may be examined to determine whether the given tuple falls outside the existing region dimensions (block 406). For example, the given tuple may be examined to determine whether any latitude or longitude coordinate of the given tuple respectively falls outside a latitude or longitude coordinate of the dimensions of the corresponding region. In one embodiment, such an examination may include determining whether any of the following conditions is true:

lat<lat1, lat>lat2, lon<lon1, lon>lon2.

Referring to the previous example, evaluating the tuple (2,2,1) with respect to the default region dimensions given above results in the first and third conditions being satisfied. However, it is contemplated that in other embodiments, other suitable tests based on region coordinates, boundaries, axes or other representations of region dimensions may be employed to determine whether a given tuple falls outside existing region dimensions.

If the given tuple falls outside the existing region dimensions, the dimensions may be expanded to encompass the given tuple. For example, in one embodiment, for any given coordinate of the region dimensions for which a corresponding one of the above conditions is satisfied, that coordinate of the region dimensions is replaced by the corresponding coordinate of the given tuple (block 408). Thus, in the current example, the coordinate (lat1, lon1) is changed from (4,3) to (2,2). This process may then iterate over the remaining tuples in the group (blocks 410, 406). Once all tuples within a group have been processed, the resulting region dimensions may be saved (block 412). If other groups of tuples remain to be processed, dimensions of corresponding regions may be determined in a similar fashion (blocks 414, 402). Otherwise, grouping of destinations 120 into regions is complete.

Application of the method of FIG. 4 to the tuples of FIG. 3 yields two geographical regions 200a-b (or simply, regions 200). In the illustrated embodiment, geographical region 200a corresponds to a transit time of 2 for a particular shipping method 130 from a particular source 110, and has dimensions <(0,0),(5,7)>. Similarly, geographical region 200b corresponds to a transit time of 1 for particular shipping method 130 from particular source 110, and has dimensions <(2,2),(4,5)>. As shown in FIG. 3, depending on the grouping method, it is possible for regions 200 to overlap or for one region 200 to be located entirely within another. In some embodiments regions 200 may be rectangular or approximately rectangular. However, depending on the coordinate system employed, other region shapes are possible (e.g., in a polar coordinate system, circular regions may be easier to manipulate than rectangular regions).

The method just described for grouping destination transit time data into geographical regions may result in the definition of a minimum number of larger regions by virtue of first grouping data according to transit time similarity. If the actual shape of a contiguous region (e.g., as determined by connecting the outermost tuples of the region) is fairly symmetrical and convex, this minimization may be acceptable. However, if a region has a concave or asymmetrical shape, other grouping methods are possible and contemplated that may yield more accurate groupings. For example, instead of one large region corresponding to a given transit time, a larger number of smaller regions each corresponding to the given transit time may be formed. In one embodiment of such an alternative grouping algorithm, transit time tuples may first be arranged into a two-dimensional array, with each row of the array containing tuples of equal latitude and the rows ordered according to increasing or decreasing latitude. The grouping algorithm may then traverse rows of the array. While traversing the array, if the tuples encountered have the same transit time, steps 404-410 of the method of FIG. 4 may be applied to determine the dimensions of the region. If a tuple with a dissimilar transit time is encountered, the previous region is completed and the dimensions of a new region including the dissimilar tuple are determined.

Modeling Transit Characteristic Probability Distributions

In the examples given above to illustrate the grouping of transit time data into regions, transit times were given as integer values of time. However, in many instances, actual transit time or other characteristic data may be more continuously distributed across a range of values. For example, although the majority of transit time data points within a region corresponding to a latency of 1 may be fairly close to 1 (e.g., ranging from 0.8 to 1.2), some data points within that region might range in latency from, e.g., 0.2 to 4.5. By modeling the distribution of transit time data within a given region, more sophisticated types of transit time analysis and prediction may be performed, as described in greater detail below. Although the following discussion generally refers to transit times in units of days, it is contemplated that any suitable unit or granularity of transit time may be employed (e.g., hours, weeks, months, etc.).

Figure 5:
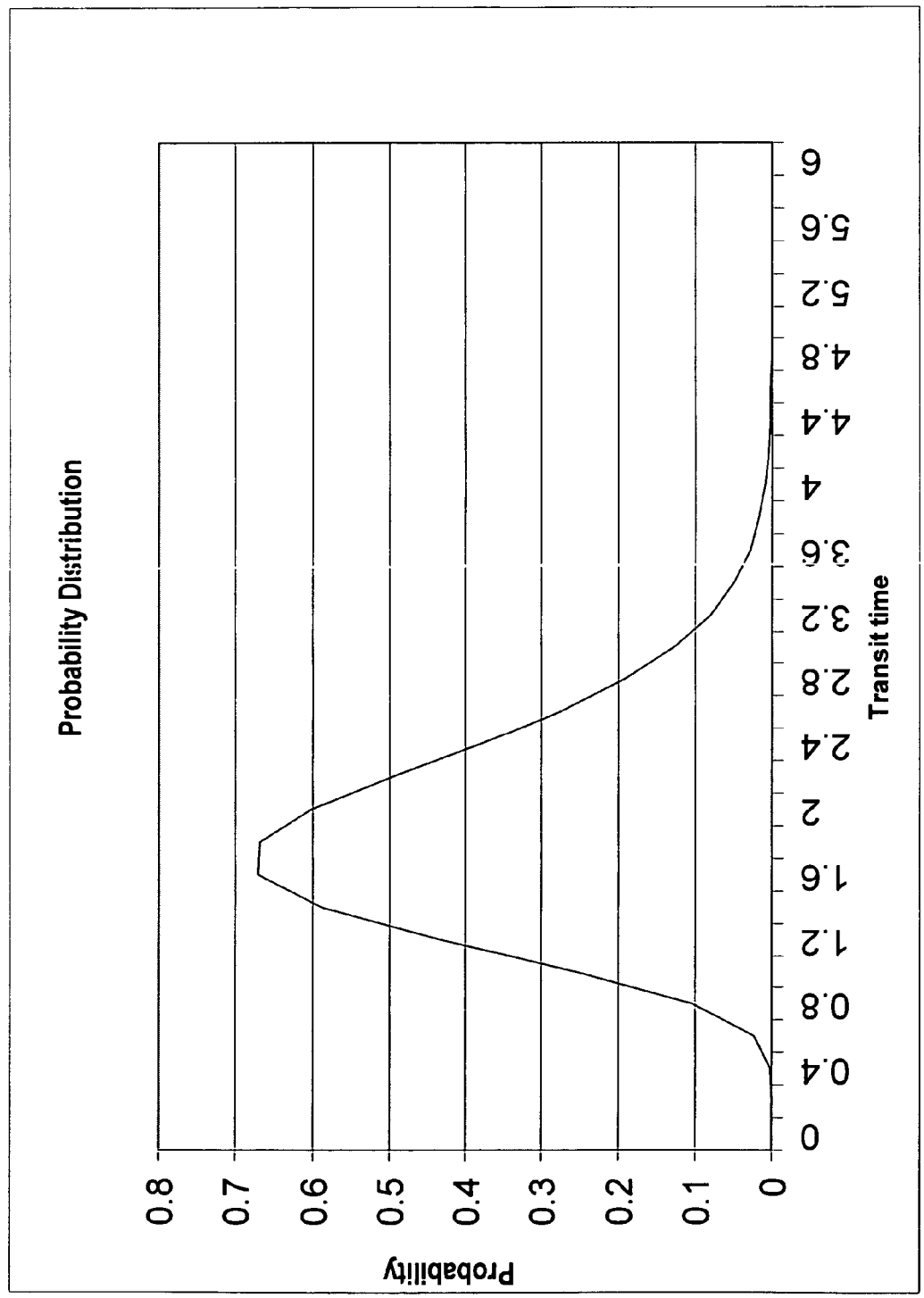
FIG. 5 is a graph illustrating one embodiment of transit time probability distribution.

A probability distribution or other representative distribution of a transit characteristic may be generated through analysis of transit characteristic data. For example, a histogram representing the frequency distribution of the tuples described above with respect to transit time may be constructed and generalized into a probability distribution representing the probability or likelihood that a given transit time value to the region 200 will be achieved. One exemplary embodiment of a transit time probability distribution is illustrated in FIG. 5. As described in greater detail below, such a distribution may be representative of a region 200 or of an individual destination 120. In the illustrated embodiment, the individual probabilities that a transit time to region 200 or an individual destination 120 (from a particular source 110 via a corresponding shipping method 130) will be a time less than 0.4 days or greater than 4.4 days are nominally zero. The probability that a transit time to region 200 will be 1.0 days is approximately 0.25 (or 25%), while the probability that a transit time will be 1.6 days is approximately 0.67 (or 67%).

In general, the total or cumulative probability that a transit time will be less than or equal to a given transit time, according to a particular probability distribution, is given by the sum of all probabilities for transit times less than or equal to the given transit time. Such a sum may be obtained, for example, by determining the area under the probability distribution curve between 0 and the given transit time, such as by performing numerical or analytical integration of the probability distribution curve. For example, referring to FIG. 5, the total probability that a transit time will be less than or equal to 2.0 days is equal to the area under the curve between 0 and 2.0, or approximately 61%. That is, according to the illustrated probability distribution, there is a 61% total probability or confidence that transit to region 200 will be complete in 2.0 days or less. Cumulative probability may also be referred to herein as a surety factor or simply as surety. For example, for the distribution of FIG. 5, there exists a 98% surety that a given shipment to region 200 will be complete in approximately 3.4 days or less.

In some embodiments, transit characteristic data points may conform to a specific probability distribution for which there exists a general mathematical model of the distribution. Such mathematical models often have far fewer characteristic parameters than the number of data points themselves, and consequently may provide a more efficient representation of a probability distribution than the actual transit time frequency or probability histogram. For example, the distribution illustrated in FIG. 5 conforms to a gamma distribution, which may be characterized by the relation:

$$P(t) = t^{shape-1} \frac{e^{-t/scale}}{\Gamma(shape) \cdot scale^{shape}}$$

where t denotes a transit time value, P(t) denotes the individual (i.e., not cumulative) probability of t, Γ(x) denotes the gamma function, and shape and scale denote parameters of the gamma distribution, which are related to and can be derived from the mean and variance of the data. However, it is noted that use of a gamma distribution is not essential, and that other distribution models (e.g., Poisson distribution, normal distribution, uniform distribution, etc.) may be appropriate to different types of transit systems having different underlying behavioral assumptions. In some embodiments, the fit of a set of transit time data against several possible probability models may be tested using standard curve-fitting techniques, while in other embodiments transit time data may be assumed to conform to a particular model based on, e.g., an a priori understanding of the dynamics of the behavior of the system generating the data.

Figure 6:
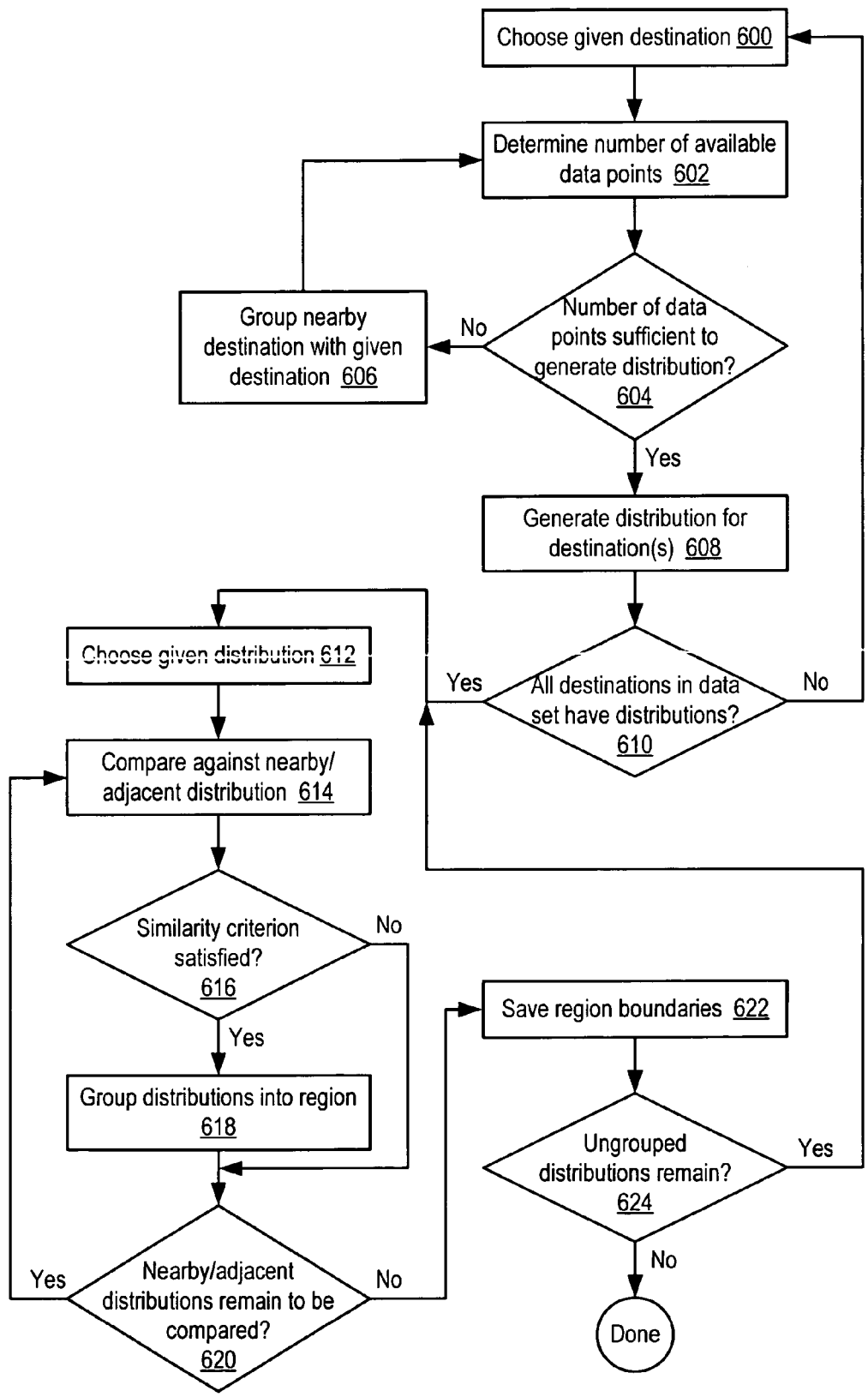
FIG. 6 is a flow diagram illustrating one embodiment of grouping destinations into geographical regions according to distributions of transit characteristics.

In contrast to the embodiment of the method illustrated in FIG. 4, in one embodiment, grouping of destinations 120 into regions according to a similarity criterion may be performed by applying the similarity criterion to a data distribution (e.g., a probability distribution as described above) rather than individual transit characteristic data points. One embodiment of such an alternative method is illustrated in FIG. 6. Referring to FIG. 6, operation begins in block 600 where a given destination 120 corresponding to a particular source 110 and method 130 is chosen. The number of available transit characteristic data points corresponding to given destination 120 is then determined (block 602). For example, a destination 120 corresponding to a busy commercial location such as an office building may have numerous data points resulting from historical shipments, whereas another destination 120 may have few or only one historical data point.

In some embodiments, the quality of a distribution's reflection of actual data may depend on the existence of a sufficient number of data points from which to generate the distribution. For example, it may be difficult to discern a complex distribution from only two or three data points. Consequently, in the illustrated embodiment, if the number of data points corresponding to the given destination 120 is not sufficient to generate a distribution (e.g., fewer than 50, 100 or another suitable threshold number of data points), another destination 120 nearby the given destination 120 may be grouped with the given destination 120 (blocks 604-606). For example, data points corresponding to a destination 120 having an address that is adjacent to or near given destination 120 may be grouped with given destination 120.

In the illustrated embodiment, blocks 602-606 may repeat until the number of data points corresponding to one or several destinations 120 is sufficient to generate a distribution, at which point the distribution corresponding to the destination(s) 120 is generated (block 608). For example, a distribution may be generated using suitable statistical, numerical or other algorithmic techniques as described below with respect to FIG. 7. In one embodiment, if multiple destinations 120 are used to generate a distribution, the coordinates of the multiple destinations 120 may be used to determine the boundaries enclosed by the distribution in a manner similar to that described above in FIG. 4.

After the distribution is generated for the given destination 120 (and nearby destinations 120, if necessary), it is determined whether distributions have been generated for all destinations 120 in the data set being processed (block 610). If not, another given destination is chosen and operation continues from block 600. It is noted that in some embodiments, the data set processed by the method of FIG. 6 may include a subset or portion of all available transit characteristic data points, while in other embodiments all available data points may be processed.

Once distributions are available for all destinations 120, either individually or by virtue of the grouping process described above, distributions that satisfy a similarity criterion may then be grouped together into a region 200. In the illustrated embodiment, a given distribution is chosen (block 612) and compared against a nearby or adjacent distribution (block 614) to determine whether a similarity criterion is satisfied by the two distributions (block 616). For example, in one embodiment, comparison of two distributions may include determining the absolute difference in area under the graphical representations of each distribution, using standard analytical or numerical techniques. In such an embodiment, the similarity criterion may specify an absolute or relative threshold below which the two distributions may be considered similar. In other embodiments, comparison of distributions may be performed using other techniques, such as by comparing statistical parameters of the distributions (e.g., mean, median, variance), for example.

If the two distributions satisfy the similarity criterion, they are grouped into a single region 200 (block 618). For example, the dimensions of the region 200 may be determined by reference to the coordinates associated with the two distributions (e.g., the coordinates of the underlying destinations 120, or the area encompassed by the distributions as may be determined in block 608). In one embodiment, the two distributions may be combined or averaged to generate a single distribution corresponding to region 200, while in another embodiment, the distribution associated with region 200 may be derived afresh from the underlying data points for the included destinations 120.

In the illustrated embodiment, if nearby or adjacent distributions remain to be compared with the given distribution or the distribution of a newly formed region 200 (block 620), comparison between distributions may continue until all nearby or adjacent distributions have been compared. Once comparison is complete, the boundaries of the region 200 may be saved (block 622). If distributions remain that have not yet been grouped into a region 200 (block 624), another given distribution may be chosen and operation may continue from block 612. Otherwise, grouping is complete.

Generally speaking, operation of the method illustrated in FIG. 6 may result in the "growing" or coalescence of regions 200 from a given distribution through progressive comparison with adjacent distributions. If a given distribution does not satisfy the similarity criterion with respect to a particular adjacent distribution, growth of the region 200 in the general direction of the particular adjacent distribution may stop, although growth may continue in other directions. Although comparison of distributions has been described as serial, binary comparison for the purposes of illustration, in other embodiments it is contemplated that multiple binary comparisons of distributions may occur concurrently. It is also contemplated that three or more distributions may be concurrently evaluated in a single comparison (e.g., comparison may be binary or N-way comparison).

As noted above, regions 200 may be performed by grouping distributions of transit characteristic data values, as just described, or by grouping of individual transit characteristic data values, such as illustrated in FIG. 4. In the latter case, rather than employing a similarity criterion in the comparison process, in some embodiments the precision of transit time data may be reduced by rounding, truncation, application of ceiling or floor functions, or other types of data conditioning prior to grouping into regions. For example, transit times 2.05 and 1.92 may each be rounded to the closest integer value of 2, which may facilitate placing both data points in the same region. Such a data conditioning step may be performed, for example, prior to the application of the method of FIG. 4 or a suitable variant thereof. However, once the dimensions of a region 200 have been determined, all the transit characteristic data points (e.g., the tuples described above) that fall within the region 200 may be analyzed in the aggregate to determine how they are probabilistically distributed within the region.

Figure 7:
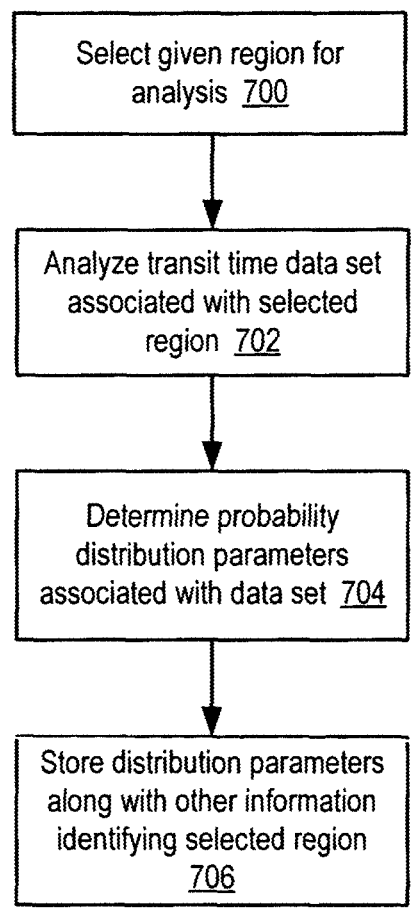
FIG. 7 is a flow diagram illustrating one embodiment of a method of determining a transit time probability distribution associated with a geographical region.

One embodiment of a method of determining a probability distribution associated with a particular destination 120 or a given region 200 is illustrated in FIG. 7. Although the method may be applied to any collection of data points corresponding to a destination 120 or region 200, for simplicity the steps of FIG. 7 refer to operation relative to a region 200. Referring collectively to FIGS. 1-7, operation begins in block 700 where a given region 200 is selected for analysis. For example, in one embodiment the region 200 may have been previously determined by grouping of transit time data according to similarity, as described above.

The transit time data set (e.g., the collection of tuples) associated with the selected region 200 is then analyzed, for example by determining statistical characteristics of the data set such as mean and variance (block 702). In some embodiments, if the target probability distribution is to be determined by determining the fit of the data set to various distributions, such curve-fitting may also be performed as a part of this step.

Parameters specific to the data set and selected probability distribution are then determined (block 704). For example, in the case of the gamma distribution, shape and scale parameters may be determined from the previously determined statistical characteristics. Finally, the distribution parameters associated with the selected region 200 are stored along with other information identifying region 200, such as its dimensions in terms of latitude and longitude coordinates (block 706). For example, in one embodiment, data corresponding to a region 200 such as its corresponding source 110, shipping method 130, dimensions and distribution parameters may be stored as a row or other type of record within a table or database.

In some embodiments, the reliability of a given probability distribution in characterizing the transit time behavior of a region 200 may depend on the quantity and quality of the data set used in determining the distribution. For example, a certain threshold number of data points may be needed in order to have confidence that the distribution reflects the actual behavior of the region (for instance, it may be impossible to distinguish a meaningful general relationship among only three or four data points). Similarly, if the data set includes a large number of outliers (anomalous data points that do not fit the distribution of the rest of the data), the resulting distribution may be skewed. Correspondingly, in some embodiments, the analysis of the transit time data set (e.g., in step 702 above) may include checking whether the data set includes a sufficient number of points for analysis as well as checking for outliers. If insufficient or skewed data is present, no distribution parameters may be generated, or the resulting distribution parameters may be flagged as possibly unreliable. Alternatively, if sufficient data is present, outliers may be identified and removed from the data set before distribution parameters are determined.

It is noted that because a given surety factor p corresponding to a transit time t represents a p chance that an actual transit time will be less than or equal to t, there exists a (1-p) chance that an actual transit time will be greater than t. For example, a 98% surety factor corresponding to a transit time of 3.6 days implies a 2% probability that the transit time will be greater than 3.6 days. In some embodiments, such "anti-surety" factors may be employed to manage the likelihood of an event not happening. For example, it may be desirable in some embodiments to ensure that a shipment does not reach its destination until after a certain date, such as an embargo date. Anti-surety factors may be employed in a manner similar to surety factors in the discussion that follows.

Predicting Transit Characteristics Using Regions

It is noted that the number of regions 200 generated for a given set of transit characteristic data tuples may be substantially fewer than the number of tuples themselves. Consequently, prediction of a transit time or other transit characteristic to a given destination 120 may be reduced to a matter of determining the region 200 in which given destination 120 belongs, rather than searching a large quantity of transit time data for a tuple corresponding to given destination 120. That is, prediction of a transit characteristic of a given destination 120 may be reduced to a problem of determining set membership (e.g., region membership) of given destination 120, rather than a problem of determining historical data specific to given destination 120, which may not exist or may be insufficient for prediction.

It is also noted that, depending on how transit characteristics are distributed among destinations 120, in some embodiments destinations 120 whose relevant transit characteristics satisfy a similarity criterion may be grouped into multiple discontiguous regions 200. For example, in one embodiment destinations 120 may exhibit transit latencies that are clustered around the locations of shipping hubs. In such an embodiment, several discontiguous "island" regions 200 having similar latencies or latency distributions may be formed around the shipping hubs and separated by regions 200 having dissimilar latencies or distributions.

Figure 8:
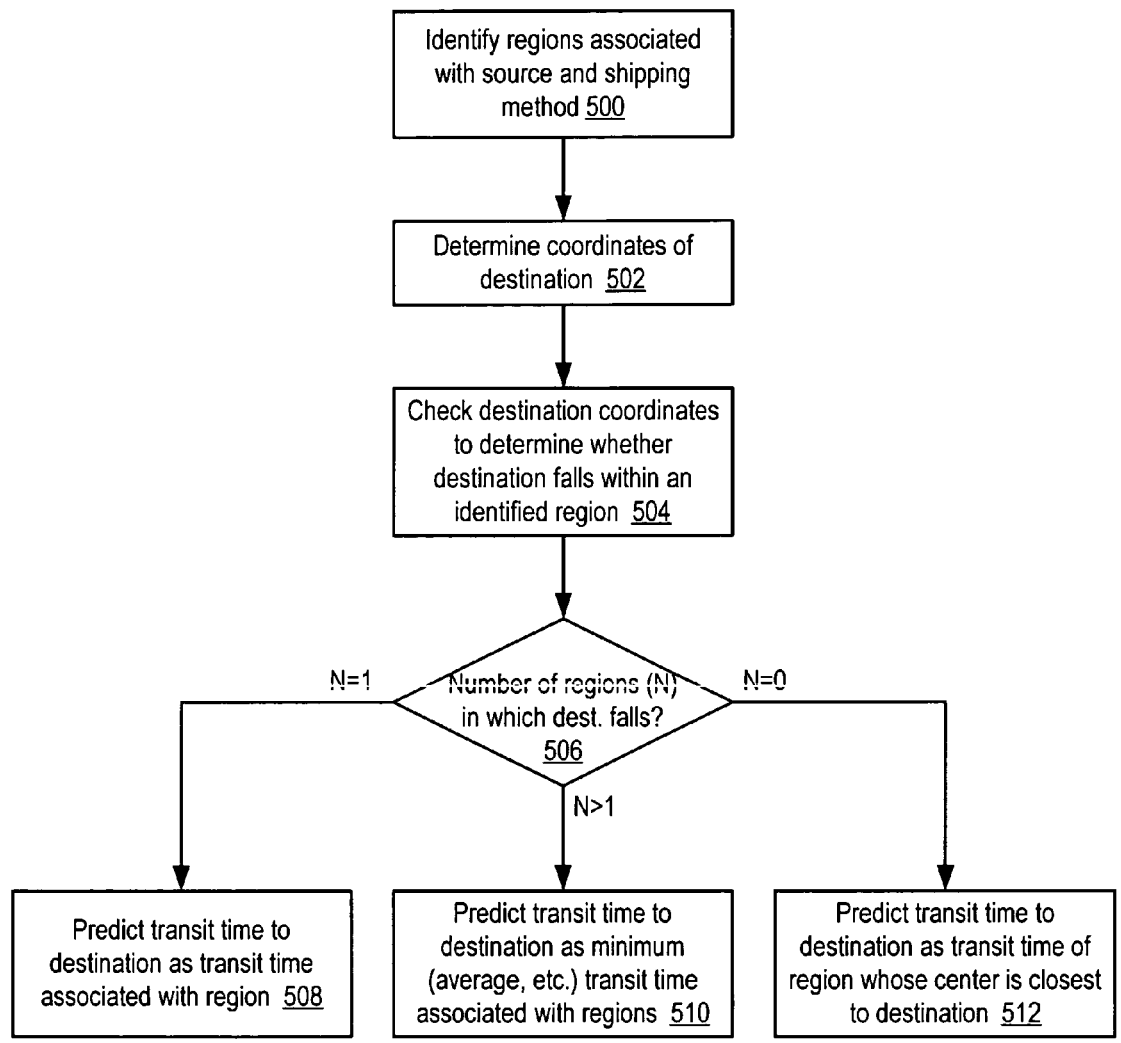
FIG. 8 is a flow diagram illustrating one embodiment of a method of predicting transit time to a destination using geographical regions.

One embodiment of a method of predicting transit time of a shipping method 130 from a given source 110 to a particular destination 120 using regions 200 is illustrated in FIG. 8. Referring collectively to FIGS. 1-8, operation begins in block 500 where the regions 200 associated with source 110 and shipping method 130 are identified. For example, in some embodiments, regions 200 may be generated for multiple different sources 110 and multiple different shipping methods 130 from a given source 110.

Next, the coordinates of destination 120 are determined (block 502). For example, if destination 120 is specified as a shipping address including a postal code, the address may be translated into the appropriate coordinate system (e.g., latitude, longitude). Such a translation may be performed by, e.g., consulting a mapping service to obtain precise coordinates, or in some embodiments by simply mapping a portion of the postal code or destination city to a representative set of coordinates.

The coordinates of destination 120 are checked against the previously identified regions 200 to determine whether they fall within one or more regions 200 (block 504). Generally speaking, for a region 200 whose dimensions are given as <(lat1,lon1), (lat2,lon2)> as described above, a destination having coordinates (lat,lon) may fall within the region if both lat1≤lat≤lat2 and lon1≤lon≤lon2. For example, a destination 120 having coordinates (3.5, 3.5) falls within both regions 200a and 200b of FIG. 3, while a destination having coordinates (5.7, 6) falls only within region 200a.

If destination 120 falls within exactly one region 200, the predicted transit time to destination 120 is the transit time associated with that region 200 (blocks 506, 508). If destination 120 falls within more than one region 200, the predicted transit time to destination 120 may be chosen as the minimum transit time associated with the regions 200 to which destination 120 belongs (blocks 506, 510). (In alternative embodiments, if the regions 200 to which destination 120 belongs are not completely overlapping, a less optimistic selection of transit time may be chosen, e.g., by averaging the transit times of the regions.)

Destination 120 may not fall within any defined region 200, for example if it is located in an area with little or no prior shipping history. If this is the case, in one embodiment the transit time of the region 200 whose center is closest to destination 120 may be chosen as the predicted transit time for destination 120 (blocks 506, 512). In some embodiments, if one or more regions 200 are completely enclosed by another region 200, only the center of the outermost region 200 may be considered. For example, referring to FIG. 3, a destination 120 having coordinates (10, 11) falls outside of region 200a. There being no other defined regions nearby, transit time associated with this destination may be predicted to be the transit time of region 200a (e.g., 2). It is noted that in some instances, transit time predictions associated with destinations 120 that fall outside of known regions 200 may be considerably inaccurate, and in some embodiments such predictions may be treated as exceptional cases (e.g., flagged for special handling).

It is noted that in some embodiments, regions 200 may not be static, but rather may be dynamically redefined as additional empirical transit time data is collected. For example, in one embodiment the grouping algorithms of FIG. 4 or 6 may be performed in real time (e.g., continuously) or at intervals (e.g., weekly, monthly, etc.) to take into account underlying changes in the transit time performance of a given shipping method 130. For example, if a common carrier changes its schedule, its capacity between various hubs, or other logistical factors, transit time to different destinations 120 may correspondingly change. Regenerating regions 200 to align them with current empirical data may assist in maintaining overall predictive accuracy of regions 200, in contrast to conventional region mapping techniques that may be based on relatively static geographical or political boundaries that may bear little relationship to transit time behavior.

However, in some embodiments, not all fluctuations in empirical transit time data may be reflected in regions 200. In one embodiment exceptional, transient or anomalous transit time data may be excluded from the region-generating process. For example, weather conditions may cause temporary delays in shipping to a particular geographical area that are not indicative of a change in steady-state shipping behavior. Correspondingly, transit time data reflecting such delays may be excluded from transit time modeling, so as not to skew transit time predictions.

Model Implementation

Figure 9:
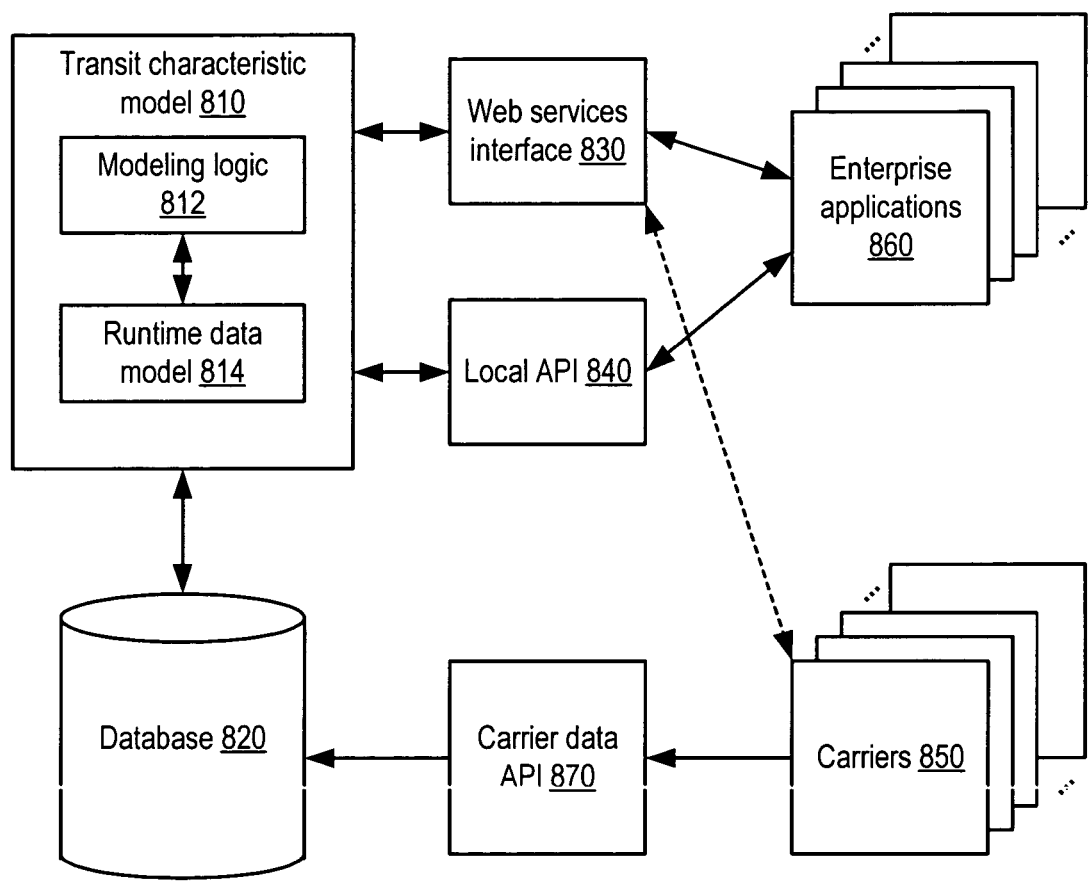
FIG. 9 is a block diagram illustrating one embodiment of a system including a predictive transit time model.

FIG. 9 illustrates one exemplary embodiment of a system including a predictive transit characteristic model configured to generate and utilize regions 200 and associated distribution information as described above. In the illustrated embodiment, transit characteristic model 810 includes modeling logic 812 and runtime data model 814, and is configured to interact with transit characteristic database 820. Additionally, transit characteristic model 810 is configured to interact with a number of enterprise applications 860 via web services interface 830 and via local application programming interface (API) 840. Further, a number of transit carriers 850 are configured to interact with transit characteristic database 820 via carrier data API 870.

In one embodiment, transit characteristic model 810 may be configured to perform the general functions of acquiring transit characteristic data, for example from transit carriers 850, grouping such data into regions 200, and determining probability distribution parameters associated with regions 200, for example as described above in conjunction with the descriptions of FIGS. 1-8. In one embodiment, for example, transit characteristic model 810 may be configured to collect and model transit latency data, and may be referred to as a transit time model. Additionally, transit characteristic model 810 may be configured to make various types of model-based predictions as described in greater detail below. In some embodiments, transit characteristic model 810 may also include certain business rules or other policies that may influence modeling and prediction, or may be configured to obtain such rules or policies from another source. For example, in some embodiments, certain items may not be allowed to be shipped via certain shipping methods 130 or to certain destinations 120. Transit characteristic model 810 may take such policies into account, for example by returning an error condition or selecting an alternate value (e.g., an alternate shipping method 130) if a transit time prediction for an illegal combination of inputs is requested. In other embodiments, policy logic may be implemented externally and transparently to transit characteristic model 810.

In the illustrated embodiment, modeling logic 812 may be configured to implement specific procedures, functions, or other types of processing routines corresponding to the general functions implemented by transit characteristic model 810, including data acquisition functions, data analysis and modeling functions, and model querying or predictive functions. In contrast, runtime data model 814 may be configured to implement the data upon which modeling logic 812 operates as described below. However, this distinction is purely illustrative, and various implementations of transit characteristic model 810 may employ different partitions of functionality. As described in greater detail below, it is contemplated that in some embodiments, transit characteristic model 810 may be implemented as program instructions and data stored on a computer-accessible medium and executable, e.g., by a processor, to perform the functions of the model.

In the illustrated embodiment, database 820 may be configured to store the various types of data utilized in transit characteristic modeling. For example, individual transit characteristic data points (e.g., tuples) collected from carriers 850 may be stored as tables or records within database 820, as may other data derived from such data points such as identities of sources 110, dimensions of regions 200, distribution parameters associated with regions 200, as well as any other data generated or required by transit characteristic model 810. In various embodiments, database 820 may be implemented as a relational database or as a nonrelational database storing structured data (e.g., data formatted according to a version of extensible Markup Language (XML) or another suitable markup language).

Transit characteristic data may be received and stored within database 820 through a different interface from the interface used to access transit characteristic model 810. For example, in the illustrated embodiment, carriers 850 (or applications hosted by the carriers) may be configured to convey transit characteristic data, such as tracking data or other records, to database 820 for storage via carrier data interface 870. In various embodiments, carrier data interface 870 may be configured to implement electronic data interchange (EDI) functionality according to various EDI standards. For example, interface 870 may be configured to implemented a version of the American National Standards Institute (ANSI) X12 EDI standard, a version of the Electronic Data Interchange for Administration, Commerce and Transport (EDIFACT) standard, or another suitable standard. In various embodiments, transit characteristic data may be conveyed from carriers 850 to database 820 in the form of EDI documents, text files, structured data such as XML-formatted data, or in another suitable format. In one embodiment, carrier data interface 870 may be configured to implement various functions to coordinate the extraction and transformation of characteristic data records into a format suitable for storage in database 820, as well as the actual loading of transformed data into database 820.

It is noted that although the illustrated embodiment shows a distinct path through which carrier data may be loaded into database 820, it is contemplated that in some embodiments, carrier data may be obtained from carriers 850 by transit characteristic model 810 via web services interface 840. That is, in such embodiments, model 810 may make standard web services calls, as described in greater detail below, to obtain transit characteristic data.

Database 820 may be particularly suited for storing and querying large quantities of varied data. However, in some embodiments the structure of region data stored by database 820 may not be well suited for dynamic processing by transit characteristic model 810. For example, database 820 may be configured to store each unique combination of source 110, shipping method 130 and region 200 as a distinct row or record without any explicit representation of the relationships that may exist among regions 200 (e.g., the relative geographical positioning of regions 200). Consequently, searching database 820 to identify the record corresponding to a desired source-destination-shipping method combination may require an exhaustive search of all of the regions 200 for which the desired source and shipping method match records in database 820.

To improve runtime performance, in the illustrated embodiment transit characteristic model 810 includes runtime data model 814. In one embodiment, runtime data model 814 may be configured to represent some or all of the source-shipping method-region associations reflected within database 820, but using a more efficient data representation that reflects spatial relationships among different regions 200, for example by mapping records from database 820 into a tree structure rather than a table structure. One exemplary data structure that may be employed by runtime data model 814 is referred to R-Trees and is described in greater detail in, for example, A. Guttman, "R-Trees: A dynamic index structure for spatial searching," in Proceedings of the Association of Computing Machinery (ACM) SIGMOD International Conference on Management of Data, 1984, pp. 47-57. In some embodiments, tree structures such as R-Trees may reduce the worst-case search depth of N records from, e.g., $O(N)$ to $O(\log N)$. However, any data structure suitable for searching of spatial or geographical data may be employed by runtime data model 814.

Generally speaking, carriers 850 may include any suitable sources of transit time data that may be used by transit characteristic model 810. Typically, carriers 850 may include any suitable type of common or private carrier that may implement a shipping method 130 as described above. In some embodiments, carriers 850 may make transit time data (e.g., tracking data) available for querying for web services interface 830, while in other embodiments transit time data may be delivered by or retrieved from a carrier 850 via a proprietary API such as API 840. For example, in some embodiments a carrier 850 may deliver to an enterprise current tracking data for all shipments currently in transit on behalf of the enterprise in the form of electronic business documents that may be transmitted, e.g., several times per day. In other embodiments, the enterprise may collect tracking data by submitting requests for data on particular shipments.

As mentioned previously, transit characteristic model 810 may make various modeling functions available to enterprise applications 860, either as web services via web services interface 830, or as local or proprietary functions accessible via API 840. Generally speaking, web services describes a general programming model through which computational services may be available to different requesters in a platform- and programming-language independent manner. Web services interface 830 may encompass any of a number of protocols that may be used to present a computational service as a web service, such as a version of the XML protocol for encoding documents, a version of Simple Object Access Protocol (SOAP), a version of Web Services Description Language (WSDL), or other related protocols.

In various embodiments, enterprise applications 860 may encompass any applications that may require or benefit from access to historical transit time data or predicted transit time behavior. For example, enterprise applications 860 may include customer ordering applications that may request predictions from transit characteristic model 810 in order to provide shipping estimates to customers, or order fulfillment applications that may seek to optimize for the lowest-cost shipping method 130 that may still meet a promised delivery date, as described in greater detail below. Enterprise applications 860 may also include audit applications, order status monitoring applications, or any other suitable applications. Like transit characteristic model 810, in some embodiments enterprise applications 860, as well as web services interface 830 and local API 840, may be implemented as program instructions and data stored via a computer-accessible medium as described below.

Applications of Transit Time Distribution Modeling

Once a set of regions 200 and corresponding distribution parameters have been determined from empirical transit characteristic data, for example by transit characteristic model 810, a number of predictive applications are possible. As described previously, a probability distribution associated with a region 200 may function to correlate a given transit time with a surety factor that the given transit time will be achieved (e.g., will not be exceeded). Correspondingly, given the probability distribution, either correlate may be determined from the other, as illustrated in the methods of FIGS. 9A-B.

FIG. 9A illustrates one embodiment of a method of determining transit time given a desired surety for a given shipment. Referring collectively to FIGS. 1-9A, operation begins in block 900 where a particular region 200 is selected. For example, in one embodiment it may be desired to ship from a particular source 110 to a destination 120 using a particular shipping method 130. Of all regions 200 corresponding to the source 110 and shipping method 130, a region 200 that includes the destination 120 may be selected as the particular region 200. In some embodiments, a destination 120 may fall into multiple qualifying regions 200, in which case each qualifying region 200 may be evaluated or one particular region 200 may be selected based on other criteria.

A desired surety factor is also specified (block 902). For example, a 98% surety that the transit time will be less than or equal to the predicted time may be specified. In some embodiments, surety factor may be specified as an argument along with arguments identifying the source 110, destination 120 and shipping method 130 in a single call to transit characteristic model 810.

The probability distribution corresponding to the selected region 200 is then evaluated with respect to the specified surety factor to determine the corresponding transit time (block 904). For example, in some embodiments an inverse cumulative probability curve may be determined from the parameters defining the probability distribution curve and used to identify a transit time corresponding to a given surety factor.

FIG. 9B illustrates one embodiment of a method of determining a surety factor given a desired transit time for a given shipment. Referring collectively to FIGS. 1-9B, operation begins in block 910 where a particular region 200 is selected, which may occur as for step 900 of FIG. 9A.

A desired transit time is also specified (block 912). For example, a two-day transit time may be desired in order to meet a shipping commitment to a customer. In some embodiments, desired transit time may be specified as an argument along with arguments identifying the source 110, destination 120 and shipping method 130 in a single call to transit characteristic model 810.

The probability distribution corresponding to the selected region 200 is then evaluated with respect to the specified transit time to determine the corresponding surety factor (block 914). For example, the probability distribution may be numerically integrated to determine the cumulative probability corresponding to the specified transit time. Alternatively, in some embodiments an analytic expression for cumulative probability may be determined and evaluated with respect to the specified transit time.

In one embodiment, the methods of FIGS. 9A-B may form the basis of basic transit time predictions implemented by transit characteristic model 810. However, these methods, or variants thereof, may also be used to form more sophisticated inquiries based on transit time and surety factor. For example, in one embodiment, transit characteristic model 810 may be configured to determine what shipping method 130, if any, satisfies both a given transit time and a given surety factor for shipment from a source 110. In one such embodiment, transit characteristic model 810 may be configured to iterate over all regions 200 corresponding to the source 110 and containing the destination 120, applying the method of FIG. 9A to each region 200 along with the given surety factor and determining whether the resulting transit time is less than or equal to the given transit time. Alternatively, the method of FIG. 9B may be applied to each region 200 along with the given transit time, and transit characteristic model 810 may be configured to determine whether the resulting surety factor is greater than or equal to the given or desired surety factor.

Other types of predictions based on transit time and surety factor are possible and contemplated. For example, in various embodiments transit characteristic model 810 may be configured to determine the lowest cost shipping method 130 that satisfies a given transit time and surety factor, or to minimize transit time for a given surety factor (or similarly, maximize surety factor for a given transit time) over a set of shipping methods 130 (e.g., shipping methods 130 representing a fixed or maximum cost, preferred shipping vendors, etc.).

More generally, in some embodiments predictions based on empirically-based transit time and surety factor may enable an enterprise to manage transit decisions based on actual shipping behavior as well as risk tolerance. For example, a surety factor of 85% may be substantially less expensive to achieve than a surety factor of 98% for a given transit latency, while still reflecting a considerable likelihood that the given transit latency will be achieved. An enterprise may weigh the cost savings of shipping methods 130 exhibiting lower surety factor to a given region 200 against the possible costs if the given transit latency is not achieved (e.g., refunds owed to customers under shipping performance guarantees, opportunity costs, etc.). For example, surety factor may be used as the basis for an expected value analysis of a shipping scenario of the form:

$$E = S \cdot \text{surety} - C \cdot (1 - \text{surety})$$

where S and C respectively denote the savings and costs if the transit time is achieved or not achieved, and surety is expressed as a fractional value.

In some embodiments, such an expected value analysis based on surety factor may be employed as the basis for determining whether to offer a customer a performance guarantee (e.g., insurance or compensation payable to the customer in the event the promised level of transit performance is not achieved), and/or the potential cost of such a guarantee (e.g., that may be charged to the customer, absorbed by the enterprise, or charged to a third party insurer or reinsurer). For example, high surety may imply low risk of failure to perform, and thus minimal risk in guaranteeing performance by, e.g., offering a full or partial refund of shipping costs to a customer in case of such a failure. Correspondingly, the cost to guarantee performance may be relatively low. Conversely, low surety may imply high risk of failure to perform, and a correspondingly higher cost to insure performance.

Similarly, in some embodiments shipping methods 130 may be selected on the basis of transit time and surety factor for a specific destination 120 rather than on the method itself. Conventionally, a customer typically specifies a desired shipping method 130 to be used to fulfill an order. However, in one embodiment a customer may specify a desired transit time and/or surety factor, and transit characteristic model 810 may be configured to determine whether a given shipping method 130 satisfies the given constraints. For example, in one instance a customer may desire a single-day transit time with a reasonably high (e.g., 85%) surety factor. Rather than default to an expedited shipping method 130 such as overnight shipping, transit characteristic model 810 may identify that a less expensive shipping method 130 such as ground shipping yields the desired transit time and surety factor for the customer's destination 120. In various embodiments, the cost savings realized by identifying a satisfactory, less expensive shipping method 130 in this manner may be retained as profit margin, offered to the customer as a cost reduction, or a combination of these.

In some embodiments, transit characteristic modeling as described above may also be used in conjunction with a method or system for speculative or anticipatory package shipping, as described in greater detail in U.S. patent application Ser. No. 11/015,288, entitled "Method and system for anticipatory package shipping" and filed on Dec. 17, 2004, and in U.S. patent application Ser. No. 11/015,290, entitled "Method and system for forecasted package shipping using late-select addressing" and filed on Dec. 17, 2004, each of which is hereby incorporated by reference in its entirety. Generally speaking, speculative or anticipatory shipping of a package includes shipping the package to a destination geographical area without completely specifying a delivery address for the package at the time of shipment, and completely specifying the delivery address while the package is in transit. Such shipping may be understood to be "anticipatory" in that it may be performed in anticipation of a customer actually placing an order or request for the contents of the package (e.g., prior to the order actually occurring). For example, a package may be shipped to a particular geographical area (e.g., a metropolitan area) when there is a reasonable expectation that by the time the package arrives in the particular geographical area, a customer will have placed an order or request for the package contents, and the package may then be routed to the delivery address of the customer.

Transit characteristic modeling may be particularly useful in conjunction with anticipatory package shipping. In some embodiments, the geographical regions 200 of the transit characteristic model may correspond to geographical areas to which a package may be anticipatory shipped. Correspondingly, in one embodiment transit characteristic model 810 may be used to predict the transit latency to a destination region 200 for an anticipatory shipped package using a given shipping method 130 and a given surety factor, as described above. The predicted transit time may then be used as a guide or metric for the window of time in which the package may be in transit before a corresponding customer order needs to occur, or the package needs to be returned, stored or redirected to another geographical region 200. In another embodiment, the desired transit time and surety factor (e.g., 5 days at 98% surety) may be specified, and transit characteristic model 810 may be configured to identify destination regions 200 and/or shipping methods 130 that qualify. More generally, in some embodiments transit characteristic model 810 may be configured to optimize for (e.g., to maximize, minimize, or solve for an optimal value) any one or more of transit time, surety factor, shipping method 130 or cost thereof, or destination region 200, given specified values for the remaining parameters. In some embodiments, transit characteristic model 810 may also model other variables that may be incorporated into the prediction and optimization processes, in addition to those variables that may be derived from empirical transit characteristic data. For example, in some embodiments transit characteristic model 810 may be integrated with other models that may predict customer demand, future item pricing behavior, or other variables.

Transit characteristic modeling and prediction such as described above may also be useful in conjunction with other shipping and inventory management techniques. For example, an enterprise may employ forward-deployed inventory as an alternative to using a small number of centralized inventory facilities. Generally speaking, forward-deployed inventory includes the placement of inventory items at locations or nodes that are relatively close to potential customers, for example by implementing relatively small, localized inventory facilities or by contracting with common carriers to keep a supply of ready-to-ship inventory items at or near shipping hubs. In one embodiment, each inventory node within a forward-deployed inventory system may be treated as a source location 110 for the purposes of transit characteristic modeling, which may considerably simplify transit data management over point-to-point modeling approaches especially if a large number of nodes are used.

It is noted that in various embodiments, transit characteristics may be modeled to an arbitrary level of granularity or precision. For example, transit latency may be modeled not only in days, but in hours or fractions of hours. Modeling transit latency with relatively fine granularity may enable the prediction of transit latencies within very narrow windows. For example, in one embodiment, transit characteristic model 810 may be configured to predict transit latency and associated surety for time windows as short as several hours, or even several minutes. Such fine-grained predictions may enable an enterprise to offer a variety of narrowly-targeted transit options to customers. For example, fine-grained predictions may allow a customer to specify same-day delivery, a given window of time for delivery on a given day, or a given window of time for delivery relative to the current time (e.g., delivery within the next N hours from the current time). Modeling of surety factors in conjunction with fine-grained transit latency prediction may also enable a customer to specify closed-ended rather than open-ended delivery windows. That is, a customer may specify that if delivery cannot occur within an indicated window, the delivery should be cancelled (as opposed to being delivered later). The use of surety factors may enable a shipper to manage the risk associated with failing to fulfill closed-ended delivery windows in a manner similar to the performance guarantees described above.

Exemplary Computer System Embodiment

It is contemplated that in some embodiments, any of the methods or techniques described above may be implemented as program instructions and data capable of being stored or conveyed via a computer-accessible medium. Such methods or techniques may include, for example and without limitation, the functions of transit characteristic model 810, database 820, web services interface 830, local API 840, or enterprise applications 860, as well as the methods illustrated in FIGS. 4, 5, 7, 9A and 9B. Such program instructions may be executed to perform a particular computational function such as analysis of transit time data to determine region dimensions and probability distributions, implementations of specific prediction algorithms, database management and querying, remote procedure calls and web services requests, operating system functionality, applications, and/or any other suitable functions.

Figure 10A:
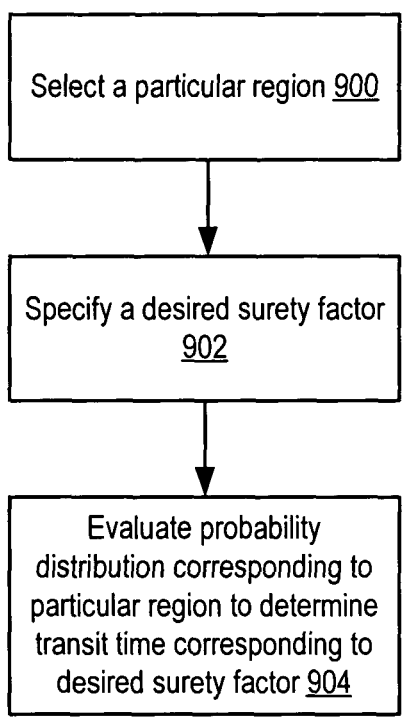
FIG. 10A is a flow diagram illustrating one embodiment of a method of determining transit time of a shipping method given a desired surety factor.
Figure 10B:
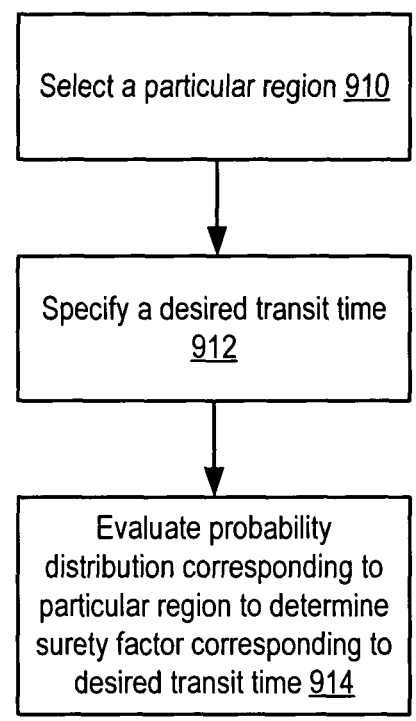
FIG. 10B is a flow diagram illustrating one embodiment of a method of determining a surety factor of a shipping method given a desired transit time.
Figure 11:
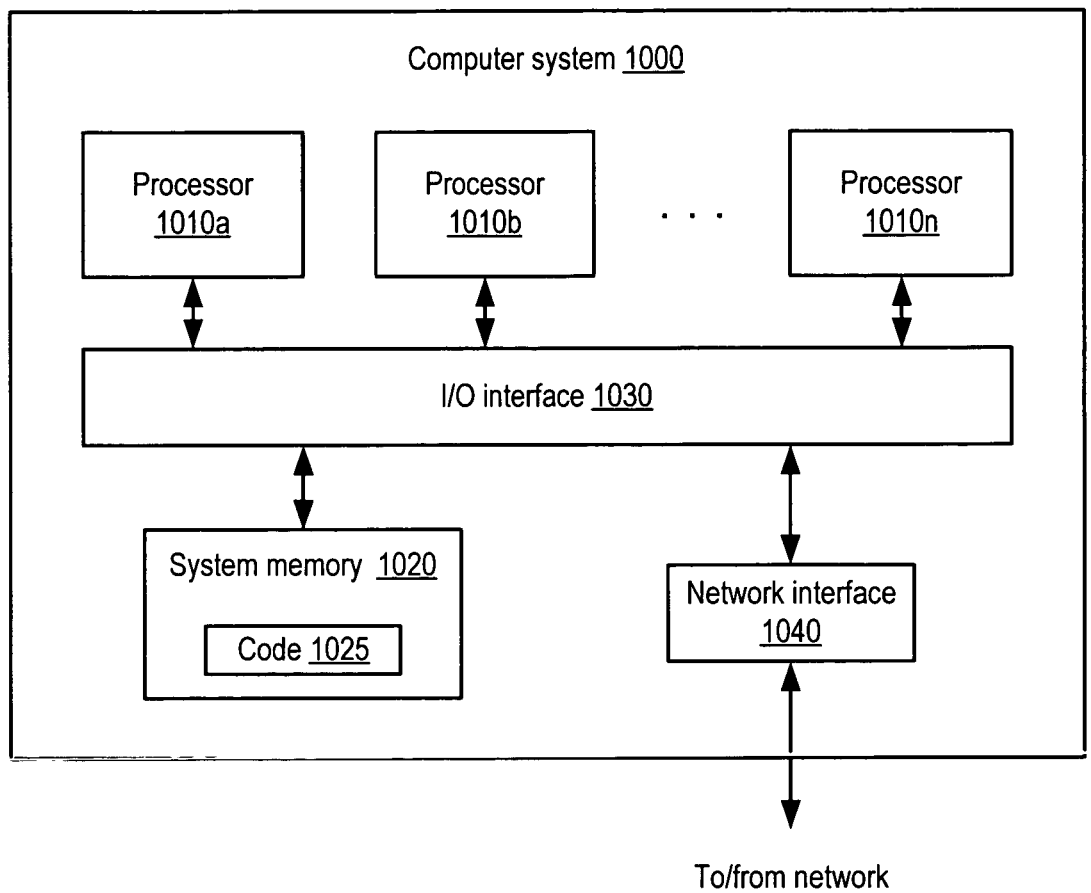
FIG. 11 is a block diagram illustrating an exemplary embodiment of a computer system.

One exemplary embodiment of a computer system including computer-accessible media is illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. In some embodiments, it is contemplated that inventory management system 50 may be implemented using by a single instance of computer system 1000, while in other embodiments multiple such systems may be configured to host different portions of inventory management system 50. For example, in one embodiment some data sources or services may be implemented via instances of computer system 1000 that are distinct from those instances implementing other data sources or services.

In various embodiments computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be a general-purpose or embedded processor implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by process 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 1020 as code 1025.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, for example. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or CD/DVD coupled to computer system 1000 via I/O interface 1030. A computer-accessible medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. A computer-accessible medium may be accessible via various transmission media or signals such as electrical, electromagnetic, or digital signals, conveyed via a communication medium such as a network and/or a wireless link, such as may be implemented via network interface 1040.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
performing by one or more computers, each comprising at least a processor and a memory:
collecting empirical transit data for a plurality of previously-shipped shipments of material;
from said empirical transit data, determining respective transit characteristics from a source location to a plurality of destination locations, wherein each of said respective transit characteristics indicates an empirically-observed aspect of a transit of material between said source location and a corresponding one of said destination locations;
grouping said plurality of destination locations according to a similarity criterion into a plurality of subsets corresponding to respective geographical regions, wherein respective transit characteristics of destination locations grouped into a given respective geographical region each satisfy said similarity criterion, and wherein each of the geographical regions is geographically defined by a respective set of dimensions, such that said grouping of destination locations into subsets occurs dependent upon the empirical transit data;

storing, in a tree data structure to improve runtime performance of the one or more computers, representations of the subsets corresponding to geographical regions as mappings of the plurality of destination locations;

determining a respective distribution associated with each of said geographical regions, wherein a given respective distribution correlates a given transit characteristic from said source location to a given geographical region with a respective surety factor, wherein said respective surety factor includes a cumulative probability that said given transit characteristic will be achieved; and dynamically updating said respective transit characteristics, said grouping of destination locations into geographical regions and said respective distributions dependent upon collecting empirical transit data;

wherein dynamically updating said respective transit characteristics comprises collecting additional empirical transit data for one or more previously-shipped shipments of material subsequent to said determining said respective transit characteristics, and, based on said additional empirical transit data, updating one or more of said respective transit characteristics to indicate an additional empirically-observed aspect of a transit of material between said source location and a corresponding one of said destination locations; and wherein for at least a given one of the geographical regions, dynamically updating a grouping of destination locations into said given geographical region comprises, in response to updating said respective transit characteristics to reflect additional empirical transit data that is different from previous empirical transit data, regrouping at least some of said destination locations dependent upon said additional empirical transit data and, based on said additional empirical transit data, changing the respective set of dimensions that geographically define the given geographical region; and in response to receiving, via a network, a request for a predicted transit characteristic that is determined at least in part on the dynamically updated dimensions of the region, providing, via the network, the predicted transit characteristic, wherein the predicted transit characteristic that is determined at least in part on the dynamically updated dimensions of the region is different from a predicted transit characteristic that is determined at least in part on the dimensions of the region prior to the dynamic update.

2. The method as recited in claim 1, wherein said respective transit characteristics include respective transit latencies from said source location to said plurality of destination locations, and wherein said respective distributions associated with said geographical regions include respective transit latency probability distributions, wherein a given one of said transit latency probability distributions comprises a plurality of data points, wherein each of said plurality of data points is indicative of a given respective value of a transit latency and a corresponding probability that the given respective value of the transit latency will occur.

3. The method as recited in claim 2, further comprising estimating a particular transit latency from said source location to a particular destination location, wherein said estimating includes:

specifying a desired surety factor for said particular transit latency;

determining a particular geographical region to which said particular destination location corresponds; and evaluating said respective transit latency probability distribution corresponding to said particular geographical region dependent upon said desired surety factor to determine said particular transit latency.

4. The method as recited in claim 2, further comprising estimating a particular surety factor from said source location to a particular destination location, wherein said estimating includes:

specifying a desired transit latency for said particular surety factor;

determining a particular geographical region to which said particular destination location corresponds; and evaluating said respective transit latency probability distribution corresponding to said particular geographical region dependent upon said desired transit latency to determine said particular surety factor.

5. The method as recited in claim 1, wherein said respective transit characteristics include respective transit latency probability distributions from said source location to one or more of said plurality of destination locations.

6. The method as recited in claim 5, wherein grouping said plurality of destinations according to said similarity criterion includes determining whether a difference between two or more respective transit latency probability distributions is less than a threshold value.

7. The method as recited in claim 6, wherein determining whether said difference between said two or more respective transit latency probability distributions is less than said threshold value includes determining an absolute difference in area underneath graphical representations of said two or more respective transit latency probability distributions and determining whether said absolute difference in area is less than said threshold value.

8. The method as recited in claim 1, wherein said respective transit characteristics include respective transit costs from said source location to said plurality of destination locations.

9. The method as recited in claim 1, wherein respective transit characteristics associated with destination locations grouped into a given geographical region correspond to a single shipping method.

10. The method as recited in claim 1, further comprising predicting a transit characteristic from said source location to a particular destination location not included within said plurality of destination locations.

11. The method as recited in claim 10, further comprising requesting said predicting of said transit characteristic via a web services interface.

12. The method as recited in claim 10, wherein predicting said transit characteristic includes:

determining that said particular destination location falls within a particular one of said geographical regions; and evaluating said respective distribution associated with said particular geographical region to determine said predicted transit characteristic.

13. The method as recited in claim 10, wherein predicting said transit latency includes:
   determining that said particular destination location does not fall within any of said geographical regions;
   identifying a particular geographical region that is closest to said particular destination location; and
   evaluating said respective distribution associated with said particular geographical region to determine said predicted transit characteristic.

14. The method as recited in claim 13, wherein identifying said particular geographical region as closest to said particular destination location includes determining the centers of said geographical regions and determining that the center of said particular region is closest to said particular destination location.

15. The method as recited in claim 1, wherein grouping said plurality of destination locations into said plurality of subsets corresponding to respective geographical regions includes defining boundary coordinates of each of said respective geographical regions.

16. The method as recited in claim 15, wherein said boundary coordinates of each of said respective geographical regions include latitude and longitude coordinates.

17. A non-transitory computer-accessible medium that stores program instructions, wherein the program instructions are executable to:
   collect empirical transit data for a plurality of previously-shipped shipments of material;
   from said empirical transit data, determine respective transit characteristics from a source location to a plurality of destination locations, wherein each of said respective transit characteristics indicates an empirically-observed aspect of a transit of material between said source location and a corresponding one of said destination locations;
   group said plurality of destination locations according to a similarity criterion into a plurality of subsets corresponding to respective geographical regions, wherein respective transit characteristics of destination locations grouped into a given respective geographical region each satisfy said similarity criterion, and wherein each of the geographical regions is geographically defined by a respective set of dimensions, such that the program instructions are executable to group said destination locations into subsets dependent upon the empirical transit data;
   store, in a tree data structure to improve runtime performance of one or more computers, representations of the subsets corresponding to geographical regions as mappings of the plurality of destination locations;
   determine a respective distribution associated with each of said geographical regions, wherein a given respective distribution correlates a given transit characteristic from said source location to a given geographical region with a respective surety factor, wherein said respective surety factor includes a cumulative probability that said given transit characteristic will be achieved;
   dynamically update said respective transit characteristics, said grouping of destination locations into geographical regions and said respective distributions dependent upon collecting empirical transit data;
   wherein to dynamically update said respective transit characteristics, the instructions are further executable to collect additional empirical transit data for one or more previously-shipped shipments of material subsequent to determining said respective transit characteristics, and, based on said additional empirical transit data, to update one or more of said respective transit characteristics to indicate an additional empirically-observed aspect of a transit of material between said source location and a corresponding one of said destination locations;
   wherein for at least a given one of the geographical regions, to dynamically update a grouping of destination locations into said given geographical region, the instructions are further executable to, in response to updating said respective transit characteristics to reflect additional empirical transit data that is different from previous empirical transit data, regroup at least some of said destination locations dependent upon said additional empirical transit data and, based on said additional empirical transit data, change the respective set of dimensions that geographically define the given geographical region; and
   in response to receipt of a request for a predicted transit characteristic that is determined based at least in part on the dynamically updated dimensions of the region,
      provide via a network, the predicted transit characteristic, wherein the predicted transit characteristic that is determined at least in part on the dynamically updated dimensions of the region is different from a predicted transit characteristic that is determined at least in part on the dimensions of the region prior to the dynamic update.

18. The computer-accessible medium as recited in claim 17, wherein said respective transit characteristics include respective transit latencies from said source location to said plurality of destination locations, and wherein said respective distributions associated with said geographical regions include respective transit latency probability distributions, wherein a given one of said transit latency probability distributions comprises a plurality of data points, wherein each of said plurality of data points is indicative of a given respective value of a transit latency and a corresponding probability that the given respective value of the transit latency will occur.

19. The computer-accessible medium as recited in claim 18, wherein the program instructions are further executable to estimate a particular transit latency from said source location to a particular destination location, wherein said estimating includes:
   specifying a desired surety factor for said particular transit latency;
   determining a particular geographical region to which said particular destination location corresponds; and
   evaluating said respective transit latency probability distribution corresponding to said particular geographical region dependent upon said desired surety factor to determine said particular transit latency.

20. The computer-accessible medium as recited in claim 18, wherein the program instructions are further executable to estimate a particular surety factor from said source location to a particular destination location, wherein said estimating includes:
   specifying a desired transit latency for said particular surety factor;
   determining a particular geographical region to which said particular destination location corresponds; and
   evaluating said respective transit latency probability distribution corresponding to said particular geographical region dependent upon said desired transit latency to determine said particular surety factor.

21. The computer-accessible medium as recited in claim 17, wherein said respective transit characteristics include respective transit latency probability distributions from said source location to one or more of said plurality of destination locations.

22. The computer-accessible medium as recited in claim 21, wherein grouping said plurality of destinations according to said similarity criterion includes determining whether a difference between two or more respective transit latency probability distributions is less than a threshold value.

23. The computer-accessible medium as recited in claim 22, wherein determining whether said difference between said two or more respective transit latency probability distributions is less than said threshold value includes determining an absolute difference in area underneath graphical representations of said two or more respective transit latency probability distributions and determining whether said absolute difference in area is less than said threshold value.

24. The computer-accessible medium as recited in claim 17, wherein said respective transit characteristics include respective transit costs from said source location to said plurality of destination locations.

25. The computer-accessible medium as recited in claim 17, wherein respective transit characteristics associated with destination locations grouped into a given geographical region correspond to a single shipping method.

26. The computer-accessible medium as recited in claim 17, wherein the program instructions are further executable to predict a transit characteristic from said source location to a particular destination location not included within said plurality of destination locations.

27. The computer-accessible medium as recited in claim 26, wherein the program instructions are further executable to implement a web services interface through which a prediction of said transit characteristic is requested.

28. The computer-accessible medium as recited in claim 26, wherein predicting said transit characteristic includes:
determining that said particular destination location falls within a particular one of said geographical regions; and
evaluating said respective distribution associated with said particular geographical region to determine said predicted transit characteristic.

29. The computer-accessible medium as recited in claim 26, wherein predicting said transit characteristic includes:
determining that said particular destination location does not fall within any of said geographical regions;
identifying a particular geographical region that is closest to said particular destination location; and
evaluating said respective distribution associated with said particular geographical region to determine said predicted transit characteristic.

30. The computer-accessible medium as recited in claim 29, wherein identifying said particular geographical region as closest to said particular destination location includes determining the centers of said geographical regions and determining that the center of said particular region is closest to said particular destination location.

31. The computer-accessible medium as recited in claim 17, wherein grouping said plurality of destination locations into said plurality of subsets corresponding to respective geographical regions includes defining boundary coordinates of each of said respective geographical regions.

32. The computer-accessible medium as recited in claim 31, wherein said boundary coordinates of each of said respective geographical regions include latitude and longitude coordinates.

33. A system, comprising:
one or more computer systems each including at least a memory and a processor configured to execute instructions, wherein the instructions are executable by the one or more computer systems to implement:
an application program;
a web services interface; and
a transit characteristic model;
wherein said application program is configured to request from said transit characteristic model via said web services interface a prediction of a transit characteristic from a source location to a given destination location;
wherein said transit characteristic model is configured to:
collect empirical transit data for a plurality of previously-shipped shipments of material;
from said empirical transit data, determine respective transit characteristics from said source location to a plurality of destination locations, wherein each of said respective transit characteristics indicates an empirically-observed aspect of a transit of material between said source location and a corresponding one of said destination locations;
group said plurality of destination locations according to a similarity criterion into a plurality of subsets corresponding to respective geographical regions, wherein respective transit characteristics of destination locations grouped into a given respective geographical region each satisfy said similarity criterion, and wherein each of the geographical regions is geographically defined by a respective set of dimensions, such that the transit characteristic model is configured to group said destination locations into subsets dependent upon the empirical transit data;
store, in a tree data structure to improve runtime performance of the one or more computer systems, representations of the subsets corresponding to geographical regions as mappings of the plurality of destination locations;
determine a respective distribution associated with each of said geographical regions, wherein a given respective distribution correlates a given transit characteristic from said source location to a given geographical region with a respective surety factor, wherein said respective surety factor includes a cumulative probability that said given transit characteristic will be achieved;
predict said transit characteristic to said given destination location, wherein said predicting includes determining that said particular destination location falls within a particular one of said geographical regions, evaluating said respective distribution associated with said particular geographical region to determine said predicted transit characteristic, and returning said predicted transit characteristic to said application; and
dynamically update said respective transit characteristics and said grouping of destination locations into geographical regions dependent upon collecting empirical transit data;
wherein to dynamically update said respective transit characteristics, the transit characteristic model is further configured to collect additional empirical transit data for one or more previously-shipped shipments of material subsequent to determining said respective transit characteristics, and, based on said additional empirical transit data, to update one or more of said respective transit characteristics to indicate an additional empirically-observed aspect of a transit of material between said source location and a corresponding one of said destination locations;

wherein for at least a given one of the geographical regions, to dynamically update a grouping of destination locations into said given geographical region, the transit characteristic model is further configured to, in response to updating said respective transit characteristics to reflect additional empirical transit data that is different from previous empirical transit data, regroup at least some of said destination locations dependent upon said additional empirical transit data and, based on said additional empirical transit data, change the respective set of dimensions that geographically define the given geographical region; and wherein in response to receipt of a request from said application via said web services interface for a predicted transit characteristic that is determined at least in part on the dynamically updated dimensions of the region, the transit characteristic model is further configured to provide, via said web services interface, the predicted transit characteristic to said application, wherein the predicted transit characteristic that is determined at least in part on the dynamically updated dimensions of the region is different from a predicted transit characteristic that is determined at least in part on the dimensions of the region prior to the dynamic update.

34. The system as recited in claim 33, wherein said transit characteristic model is further configured to dynamically update said respective transit characteristics, said grouping of destination locations into geographical regions and said respective distributions dependent upon collecting empirical transit data.

35. The system as recited in claim 33, wherein said respective transit characteristics include respective transit latencies from said source location to said plurality of destination locations, and wherein said respective distributions associated with said geographical regions include respective transit latency probability distributions, wherein a given one of said transit latency probability distributions comprises a plurality of data points, wherein each of said plurality of data points is indicative of a given respective value of a transit latency and a corresponding probability that the given respective value of the transit latency will occur.

36. The system as recited in claim 35, wherein said transit characteristic model is further configured to estimate a particular transit latency from said source location to a particular destination location, wherein said estimating includes:

specifying a desired surety factor for said particular transit latency;

determining a particular geographical region to which said particular destination location corresponds; and evaluating said respective transit latency probability distribution corresponding to said particular geographical region dependent upon said desired surety factor to determine said particular transit latency.

37. The system as recited in claim 35, wherein said transit characteristic model is further configured to estimate a particular surety factor from said source location to a particular destination location, wherein said estimating includes:

specifying a desired transit latency for said particular surety factor;

determining a particular geographical region to which said particular destination location corresponds; and evaluating said respective transit latency probability distribution corresponding to said particular geographical region dependent upon said desired transit latency to determine said particular surety factor.

38. The system as recited in claim 33, wherein said respective transit characteristics include respective transit latency probability distributions from said source location to one or more of said plurality of destination locations.

39. The system as recited in claim 38, wherein grouping said plurality of destinations according to said similarity criterion includes determining whether a difference between two or more respective transit latency probability distributions is less than a threshold value.

40. The system as recited in claim 39, wherein determining whether said difference between said two or more respective transit latency probability distributions is less than said threshold value includes determining an absolute difference in area underneath graphical representations of said two or more respective transit latency probability distributions and determining whether said absolute difference in area is less than said threshold value.

41. The system as recited in claim 33, wherein said respective transit characteristics include respective transit costs from said source location to said plurality of destination locations.

42. The system as recited in claim 33, wherein respective transit characteristics associated with destination locations grouped into a given geographical region correspond to a single shipping method.

43. The system as recited in claim 33, wherein grouping said plurality of destination locations into said plurality of subsets corresponding to respective geographical regions includes defining boundary coordinates of each of said respective geographical regions.

44. The system as recited in claim 43, wherein said boundary coordinates of each of said respective geographical regions include latitude and longitude coordinates.

45. The system as recited in claim 33, wherein said transit characteristic model determining respective transit characteristics from said source location to said plurality of destination locations includes said transit characteristic model requesting shipment tracking data for shipments in transit between said source location and said plurality of destination locations.

46. A system, comprising:

one or more computer systems each including at least a memory and a processor configured to execute instructions, wherein the instructions are executable by the one or more computer systems to implement:

a transit characteristic model determined dependent upon collected empirical data for a plurality of previously-shipped shipments of material, wherein the transit characteristic model includes representations of geographical regions as mappings of a plurality of destination locations, the representations stored in a tree data structure to improve runtime performance of the one or more computer systems, and wherein the transit characteristic model is configured to:

predict respective transit characteristics from a given source location to each a plurality of geographical regions, wherein each of said plurality of geographical regions is represented within said transit characteristic model by one or more coordinates, and wherein respective transit characteristics from said given source location to a plurality of destination locations within a given geographical region satisfy a similarity criterion;

determine a respective distribution associated with each of said geographical regions, wherein a given respective distribution correlates a given transit characteristic from said source location to a given geographical region with a respective surety factor, wherein said respective surety factor includes a cumulative probability that said given transit characteristic will be achieved;

dynamically update said respective transit characteristics dependent upon empirical observations of said respective transit characteristics, wherein to dynamically update said respective transit characteristics, the transit characteristic model is further configured to collect additional empirical transit data for one or more previously-shipped shipments of material and, based on said additional empirical transit data, to update one or more of said respective transit characteristics to indicate an additional empirically-observed aspect of a transit of material between said source location and a corresponding one of said destination locations; and for at least a given one of the geographical regions, in response to dynamically updating said respective transit characteristics to reflect additional empirical transit data that is different from previous empirical transit data, regroup at least some of said destination locations dependent upon said additional empirical data and, based on said additional empirical transit data, change one or more of the coordinates representing said given geographical region; and in response to receipt of a request for a predicted transit characteristic that is determined at least in part on the dynamically updated dimensions of the region, provide, via a network, the predicted transit characteristic, wherein the predicted transit characteristic that is determined at least in part on the dynamically updated dimensions of the region is different from a predicted transit characteristic that is determined at least in part on the dimensions of the region prior to the dynamic update.

47. The system as recited in claim 46, wherein said respective transit characteristics include respective transit latencies from said given source location to said plurality of destination locations.

48. The system as recited in claim 46, wherein the instructions are further executable to implement a web services interface through which an application is configured to request said transit characteristic prediction.

49. The system as recited in claim 46, wherein said transit characteristic model is further configured to predict a transit characteristic to a particular geographical region of a package that is shipped to said particular geographical region without completely specifying a delivery address of said package at time of shipment.

50. The system as recited in claim 46, wherein for each of said geographical regions, transit characteristics associated with destination locations included within a particular one of said geographical regions correspond to a same shipping method from said given source location.

51. The system as recited in claim 50, wherein said transit characteristic model is further configured to select a particular shipping method in response to said application specifying said given source location, a desired destination location, a desired transit characteristic, and a desired surety factor.

52. The system as recited in claim 50, wherein said transit characteristic model is further configured to predict a particular transit characteristic in response to an application specifying said given source location, a desired destination location, a desired shipping method, and a desired surety factor.

* * * * *